US012743644B2

(12) United States Patent
Jones et al.

(10) Patent No.: US 12,743,644 B2
(45) **Date of Patent: *Sep. 22, 2026**

(54) SIMULATING QUANTUM COMPUTING CIRCUITS USING SPARSE STATE PARTITIONING

(71) Applicant: NVIDIA Corporation, Santa Clara, CA (US)

(72) Inventors: Matthew Jones, Santa Clara, CA (US); Taylor Lee Patti, Orange, CA (US)

(73) Assignee: NVIDIA Corporation, Santa Clara, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 18/185,857

(22) Filed: Mar. 17, 2023

(65) Prior Publication Data

US 2024/0311667 A1 Sep. 19, 2024

(51) Int. Cl.
*G06N 10/20* (2022.01)

(52) U.S. Cl.
CPC .................................... *G06N 10/20* (2022.01)

(58) Field of Classification Search
CPC ......... G06N 10/20; G06N 3/044; G06N 10/00
See application file for complete search history.

(56) References Cited

U.S. PATENT DOCUMENTS 10,885,698 B2 * 1/2021 Muthler ................. G06N 3/084
2019/0095561 A1 * 3/2019 Pednault ................. G06F 17/16
2020/0218787 A1 * 7/2020 Doi ........................ G06N 10/20
2021/0049496 A1 * 2/2021 Kalendarov ........... G06N 10/20
2022/0067245 A1 * 3/2022 Steiger .................. G06N 10/00
(Continued)

FOREIGN PATENT DOCUMENTS

CN 115577790 B 8/2024
EP 4160491 B1 7/2025

OTHER PUBLICATIONS

Jones, Matthew et al., "Optimizing Quantum Computing Circuit State Partitions for Simulation" U.S. Appl. No. 18/185,870, filed Mar. 17, 2023, 83 pages.
(Continued)

*Primary Examiner* — Michael Jared Walker
(74) *Attorney, Agent, or Firm* — Shook, Hardy & Bacon L.L.P.

(57) ABSTRACT

In various examples, systems and methods for simulating quantum circuits using sparse state partitioning are provided. The quantum state of a quantum circuit may be partitioned into one or more state vector partition candidates that may form sparse state partitions that avoid memory operations for one or more state elements of the quantum circuit's state vector. Gate grouping, gate complexity, and/or qubit ordering optimization algorithms may be applied and the state vector partition candidate evaluated against a computing platform topology profile using a cost evaluation function. The cost evaluation function may estimate an efficiency associated with executing that state vector partition candidate given the processing resources of the currently available simulation platform for running the simulation. A state vector partition candidate optimized for the simulation platform may be passed to the simulation platform as a set of state vector partitions in order to simulate the quantum circuit.

20 Claims, 10 Drawing Sheets

(56) References Cited

U.S. PATENT DOCUMENTS

| | | | | |
|---|---|---|---|---|
| 2023/0289638 | A1 | 9/2023 | Peterson et al. | |
| 2025/0200419 | A1* | 6/2025 | Tang | G06N 10/80 |

OTHER PUBLICATIONS

Non-Final Office Action received for U.S. Appl. No. 18/185,870, mailed on Nov. 26, 2025, 12 pages.

Notice of Allowance received for U.S. Appl. No. 18/185,870, mailed on Jun. 11, 2026, 7 pages.

* cited by examiner

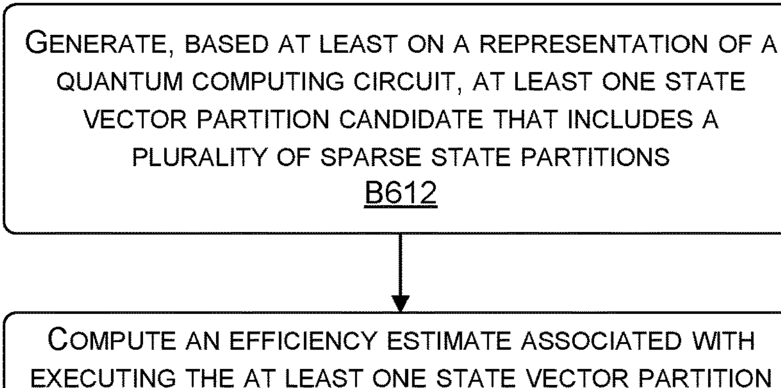

COMPUTE AN EFFICIENCY ESTIMATE ASSOCIATED WITH EXECUTING THE AT LEAST ONE STATE VECTOR PARTITION CANDIDATE BASED AT LEAST ON A COMPUTING PLATFORM TOPOLOGY OF A QUANTUM SIMULATION COMPUTING PLATFORM
B614

SELECT A SET OF STATE VECTOR PARTITIONS FROM THE AT LEAST ONE STATE VECTOR PARTITION CANDIDATE BASED AT LEAST ON THE EFFICIENCY ESTIMATE
B616

SIMULATE THE QUANTUM COMPUTING CIRCUIT ON THE QUANTUM SIMULATION COMPUTING PLATFORM USING THE SET OF STATE VECTOR PARTITIONS
B618

FIGURE 6

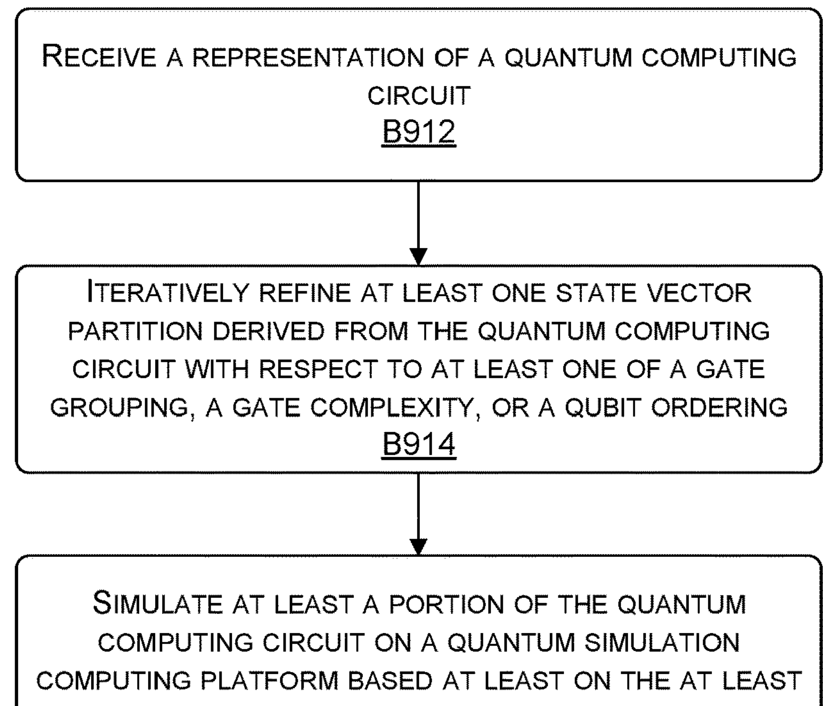
FIGURE 9

SIMULATING QUANTUM COMPUTING CIRCUITS USING SPARSE STATE PARTITIONING

CROSS-REFERENCE TO RELATED APPLICATIONS

This U.S. Patent Application is related to U.S. patent application Ser. No. 18/185,870, titled "OPTIMIZING QUANTUM COMPUTING CIRCUIT STATE PARTITIONS FOR SIMULATION", and filed on Mar. 17, 2023, which is incorporated herein by reference in its entirety.

BACKGROUND

Quantum circuits, such as those used for quantum computation, may be considered as analogous to timelines, where at any point on the timeline, qubits of the quantum computing circuit exist in a particular quantum state. Along the timeline, the quantum computing circuit may be represented in terms of individual paths that correspond to a particular qubit of the state vector for the quantum computing circuit. Quantum logic gates (which may be referred to herein simply as a "gate") represent a position along at least one path in the quantum computing circuit system where a quantum operator is executed. Quantum logic gates located along the path of an individual qubit represent a quantum operation performed using and/or on that qubit (and possibly involving other qubits) and that may affect the quantum state of that qubit and/or the quantum state of another qubit. Executing the quantum computing circuit amounts to traversing the circuit along the timeline (e.g., from left to right), while the qubits of the state vector are manipulated based on the quantum logic gates encountered on their respective paths. As such, at any point along the timeline, at a time slice across the individual paths (often represented as a column of the circuit), the state of the state vector represents the cumulative operations performed by quantum logic gates on each qubit from their initial condition to that of the given point of the timeline along the circuit execution path.

In classical computing, when complex circuitry-such as a graphics processing unit (GPU) or central processing unit (CPU)—is under development, portions of the circuitry may be simulated on a simulation computing platform so the circuit designer can better understand how different design decisions can influence circuit performance. Similarly, designers of quantum computing systems and circuits leverage emulation of quantum computers on simulation computing platforms in order to test different design options to develop better quantum computers and more effective algorithms. When a simulation of a quantum system is run on a classical computer platform, the classical computer platform is essentially executing emulations of quantum processes. While the quantum circuit represents the expression of an algorithm in an exponential quantum space, the implications of that quantum circuit can presently be explored on a classical computer more efficiently than on a quantum computer, because in the quantum space, the depth (e.g., in terms of gates encountered while traversing the circuit), noise, or expense of the quantum circuits can make executing these circuit unapproachable with quantum computers today.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure relate to simulation of quantum computing circuits using sparse state partitioning. Systems and methods are disclosed that facilitate the development of state partitions that may be used to represent a more complex quantum computing circuit within a quantum system simulation.

In contrast to existing quantum circuit simulation technologies, with one or more of the embodiments of this disclosure, the quantum state of a quantum circuit may be partitioned into one or more state vector partition candidates that, in some embodiments, may form sparse partitions. For a given state vector partition candidate, gate grouping, gate complexity, and/or qubit ordering optimization algorithms may be applied and the state vector partition candidate evaluated against a computing platform topology profile using a cost evaluation function. The cost evaluation function may estimate an efficiency associated with executing that state vector partition candidate given the processing resources of the currently available simulation platform for running the simulation. A state vector partition candidate optimized for the simulation platform may be passed to the simulation platform as a set of state vector partitions in order to simulate the quantum circuit. The set of state vector partitions may include refined sparse state partitions that avoid memory allocations and read/write operations for one or more state elements of the quantum circuit's state vector, thus eliminating memory (and/or other overhead) related latencies for processing data corresponding to state elements that play no substantive part in computing the state elements that are represented in that state partition. In some of the embodiments described herein, a state vector partition optimization may be applied to generate a refined set of state vector partitions to simulate the quantum circuit based on one or more state vector partitions that comprise sparse state partitions, non-sparse state partitions, or a combination of sparse and non-sparse state partitions, based at least in part on gate grouping, gate complexity, and/or qubit ordering optimization algorithms.

BRIEF DESCRIPTION OF THE DRAWINGS

The present systems and methods for simulation of quantum computing circuits using sparse state partitioning are described in detail below with reference to the attached drawing figures, wherein:

FIG. 6 is a flow diagram showing a method for simulation of quantum computing circuits using sparse state partitioning, in accordance with some embodiments of the present disclosure;

FIG. 9 is a flow diagram showing a method for simulation of quantum computing circuits, in accordance with some embodiments of the present disclosure;

DETAILED DESCRIPTION

Figure 1:
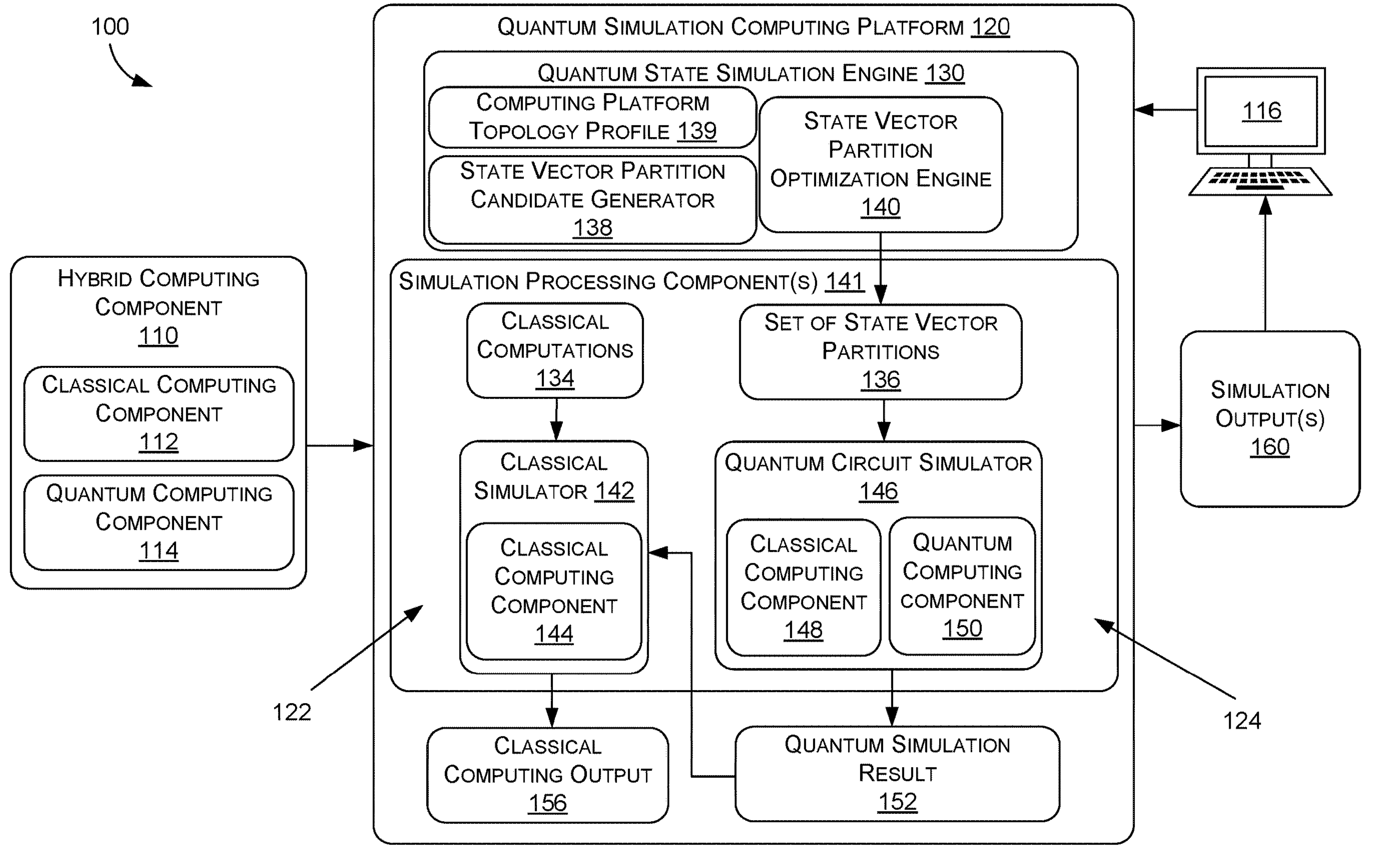
FIG. 1 is an illustration of an example flow diagram for a quantum simulation computing platform, in accordance with some embodiments of the present disclosure.

Systems and methods are disclosed related to simulation of quantum computing circuits using state partitioning. More specifically, the systems and methods presented in this disclosure facilitate improvements in efficiently simulating execution of quantum computing circuits and quantum algorithms based on the computing platform topology of a quantum simulation computing platform. Although the present disclosure may be described with respect to quantum circuit simulation, this is not intended to be limiting, and the systems and methods described herein may be used in augmented reality, virtual reality, mixed reality, robotics, security and surveillance, autonomous or semi-autonomous machine applications, and/or any other technology spaces where the execution of quantum algorithms may be used. Moreover, the present disclosure may be applied, either to the above fields or others not listed, in the context of "quantum inspired" algorithms, which are classical algorithms that adopt aspects of quantum logic, such as data update using unitary matrices. The systems and methods described herein may be used in generating and/or presenting at least one of virtual reality content, augmented reality content, or mixed reality content.

While quantum computing holds the potential for solving highly complex algorithms (for example, the Variational Quantum Eigensolver to find very precise estimates of energy structures in various molecular systems, or quantum encryption-based communication applications) there are barriers at each developmental stage for designing and testing those quantum computing circuits due to the limitations of current simulation technologies. One distinct challenge faced with simulating quantum computing systems involves the memory and processing resources of the simulation computing platform that are needed to accurately emulate, manipulate, and probe the quantum state (e.g., its corresponding state vector) of the quantum system being simulated. To accurately represent and manipulate complex state vectors, the memory requirements of a simulation computing platform scale exponentially (e.g., a scale factor of $2^n$ as a typical, non-limiting example) as a function of the number of qubits that make up the state vector.

Distributed state vector simulation represents one existing technology that can be leveraged to perform quantum circuit simulations. For example, modern classical computing resources (e.g., such as cloud platforms implemented using datacenters) often comprise multiple processing devices (e.g., CPUs, GPUs, DPUs, etc.) that can each be assigned computing tasks corresponding to a segment of a quantum circuit simulation. To simulate the quantum circuit, qubit reordering may be used to generate partitions to subdivide the computational burden between the available resources. The quantum state may be distributed into such partitions and each processing device implements gate operations on a partition assigned to that resource in a manner that minimizes communication between the devices as much as possible. However, the time that it takes to reorder qubits grows exponentially with the system size (e.g., the number of qubits that define the circuit). For large quantum circuits, increasing the number of processing devices available to perform the quantum circuit simulation increases simulation efficiency and decreases executing times for completing the simulation. However, for quantum circuits comprising smaller systems (e.g., less than approximately 26 qubits), operational overhead related latency factors (e.g., such as latencies associated with memory operations) begin to become the dominant factors contributing to quantum circuit simulation execution times. For such small systems, further distributing the simulation by adding an additional processing device actually increases execution times and decreases simulation efficiency. This limit on distributed state vector simulation scalability is particularly problematic because many quantum circuits for addressing fundamental classical tasks—such as quantum search algorithms and/or quantum machine learning algorithms—can be optimally executed as small quantum circuit systems.

In contrast to existing technologies, with one or more of the embodiments of this disclosure, the quantum state of a circuit may be partitioned into one or more state vector partition candidates that may form a set of sparse partitions. For a given state vector partition candidate, gate grouping, gate complexity, and qubit ordering optimization algorithms may be applied, and the state vector partition candidate evaluated against a computing platform topology profile using a cost evaluation function that computes a score indicating an efficiency estimate associated with executing that state vector partition candidates given the processing resources of the currently available simulation platform for running the simulation. As further detailed below, in some embodiment, a state vector partition candidate can be iteratively evaluated and refined using an optimization loop. When the cost evaluation function determines that a state vector partition candidate does not satisfy a cutoff cost threshold, the state vector partition candidate may be adjusted (e.g., with respect to partition structure, gate grouping, gate complexity, and/or qubit ordering) and the updated state vector partition candidate re-evaluated, with the processes repeating until a refined state vector partition candidate is found that satisfies the cutoff cost threshold, or until it is determined that a state vector partition candidate that satisfies the cutoff cost threshold is not readily attainable (e.g., given the current computing platform topology profile). In some embodiments, a set of candidates comprising a plurality of state vector partition candidates may be generated and individually processed by the cost evaluation function as a batch to determine which, if any, satisfy the cutoff cost threshold.

One or more of the state vector partition candidates having the best efficiency estimates (e.g., scores that satisfy the cutoff cost threshold) may then be passed to the simulation platform for execution. The results for a quantum circuit simulation may be obtained based on combining (e.g., by adding together) the results of individual sparse state partitions of the set of state vector partition candidates. The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, generative AI operations using (e.g., large) language models, cloud computing and/or any other suitable applications. The systems and methods described herein may be used in a system for compiling a quantum circuit, a system for executing a quantum circuit, a system for measuring a quantum state, and/or a system for measuring a state of a qubit or qubits.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using (large) language models, systems for performing light transport simulation, systems for performing collaborative content creation for 3D assets, systems implemented at least partially using cloud computing resources, and/or other types of systems.

With reference to FIG. 1, FIG. 1 is a data flow diagram illustrating a simulation environment 100 that includes an example quantum simulation computing platform 120, in accordance with some embodiments of the present disclosure. This and other arrangements described herein are set forth only as examples. Other arrangements and elements (e.g., machines, interfaces, functions, orders, groupings of functions, etc.) may be used in addition to, or instead of, those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example computing device 1000 of FIG. 10, and/or example data center 1100 of FIG. 11.

The simulation environment 100 may include generating and/or receiving a hybrid computing component 110 using a quantum simulation computing platform 120. The hybrid computing component 110 may include at least one quantum computing component 114 that represents a quantum computing circuit or algorithm, for example. In some embodiments, such as the embodiment shown in FIG. 1, the hybrid computing component 110 may include a classical computing component 112 (e.g., software code for execution on a non-quantum processor such as a central processing unit (CPU), or graphics processing unit (GPU), or other processing unit (e.g., DPU) or hardware accelerator). In this context, the hybrid computing component 110 may be referred to as a hybrid algorithm in that the hybrid computing component 110 may include a quantum commuting component 114 or a combination of a classical computing component 112 with a quantum computing component 114. In some embodiments, the hybrid computing component 110 may at least in part comprise hardware description language (HDL) code that describes the structure and/or behavior of a circuit (either classical, quantum, or a combination thereof) to be simulated by the quantum simulation computing platform 120. As shown in FIG. 1, the quantum simulation computing platform 120 comprises quantum state simulation engine 130 (e.g., software executed on platform 120 to initiate and control the execution of simulations based on the hybrid computing component 114) and one or more simulation processing components 141 (which are the underlying processing units that execute the simulation based on the hybrid computing component 110). The quantum simulation computing platform 120 may be used for processing (e.g., compiling and/or executing) a quantum circuit. In some embodiments, the quantum simulation computing platform 120 may be used for performing a quantum state preparation.

In some embodiments, a user device 116 comprising a human machine interface (HMI) may be coupled to the quantum simulation computing platform 120 to interface with the quantum state simulation engine 130 to control and/or monitor one or more aspects of a simulation. In some embodiments, the quantum simulation computing platform 120 may generate one or more simulation outputs 160 for display at the user device 116 based on the hybrid computing component 110. In some embodiments, the user device 116 may comprise a network node coupled to the quantum simulation computing platform 120 via one or more networks, such as but not limited to those described herein. Moreover, the quantum simulation computing platform 120 may, at least in part, be hosted using one or more cloud-based platforms and may communicate over one or more networks, such as but not limited to those described herein.

In some embodiments, the quantum simulation computing platform 120 may generate a global simulation that simulates a virtual world or environment (e.g., a simulated environment) that may include artificial intelligence (AI) vehicles or other objects (e.g., pedestrians, animals, etc.), hardware-in-the-loop (HIL) vehicles or other objects, software-in-the-loop (SIL) vehicles or other objects, and/or person-in-the-loop (PIL) vehicles or other objects. One or more outputs from the global simulation may be presented by the user device 116. The global simulation may be maintained within an engine (e.g., a game engine), or other software-development environment, that may include a rendering engine (e.g., for 2D and/or 3D graphics), a physics engine (e.g., for collision detection, collision response, etc.), a generative AI model, a large language model, sound, scripting, animation, AI, networking, streaming, memory management, threading, localization support, scene graphs, cinematics, and/or other features.

The simulation processing component(s) 141 may include any number of CPU(s), GPU(s), Quantum Processing Unit(s) (QPU(s)), quantum computing resources, and/or a combination thereof. In some embodiments, the simulation processing component(s) 141 may be bifurcated into a classical simulation path 122 and a quantum simulation path 124. In some embodiments, the simulation processing component(s) 141 may comprise the quantum simulation path 124 without the classical simulation path 122.

The classical simulation path 122 may comprise a classical simulator 142 that comprises one or more classical computing components 144 (e.g., CPU(s), GPU(s), or other processing units) that execute simulations (which may comprise at least in part a circuit simulation) based on classical computations 134 obtained or derived from the classical computing component 112. When the hybrid computing component 110 includes a classical computing component 112, the quantum state simulation engine 130 applies the one or more classical computations 134 to the classical computing components 144 for execution. The classical computing component(s) 144 execute the classical algorithm(s) 134 to generate a classical computing output 156.

In some embodiments quantum simulation path 124 may comprise a quantum circuit simulator 146 that may include computing resources to execute quantum circuit simulations (e.g., one or more simulations of the execution of quantum algorithms on a quantum processor). The quantum circuit simulator 146 may comprise computing resources that include one or more classical computing components 148 (e.g., CPU(s), GPU(s), or other processing units) that execute quantum circuit simulation algorithms based on set of state vector partitions 136 derived from the quantum computing component 114 of hybrid computing component 110. The classical computing components 148 and classical computing components 144 may, in some embodiments, be implemented using either shared processing resources, or distinct processing resources. In some embodiments, the quantum circuit simulator 146 may comprise computing resources that include one or more classical computing components 148 (e.g., CPU(s), GPU(s), or other processing units) and/or a quantum computing component 150 (e.g., a QPU and/or other quantum computing resource).

As shown in FIG. 1, in some embodiments, the quantum state simulation engine 130 may include a computing platform topology profile 139, a state vector partition candidate generator 138 and a state vector partition optimization engine 140. The computing platform topology profile 139 may describe a hardware topology of the quantum circuit simulator 146. As discussed herein, the state vector partition candidate generator 138 may generate one or more sets of state vector partition candidates based on a quantum circuit represented by the quantum computing component 114. In some embodiments, the partitioning algorithm of the state vector partition candidate generator 138 may generate one or more sets of state vector partition candidates that each represent different potential ways in which the state vector of the quantum computing circuit of the quantum computing component 114 can be subdivided into sparse state vector partitions. The state vector partition candidates may be evaluated and refined (e.g., optimized) by the state vector partition optimization engine 140 based at least in part on the computing platform topology profile 139. For example, in some embodiments, the partitioning algorithm may determine a plurality of different sets of state vector partition candidates and the state vector partition optimization engine 140 may further evaluate those state vector partition candidates to determine which state vector partition candidate(s) can be most efficiently executed by the quantum circuit simulator 146.

For a given state vector partition candidate, gate grouping, gate complexity, and qubit ordering optimization algorithms may be applied by the state vector partition optimization engine 140 to one or more sets of state vector partition candidates to produce a set of state vector partitions set shown in FIG. 1 as the set state vector partitions 136. The quantum circuit simulator 146 may execute quantum circuit simulations based on the set of state vector partitions 136 derived from the quantum computing component 114 of hybrid computing component 110.

The quantum circuit simulator 146 may process the set of state vector partitions 136 to compute an output comprising a quantum simulation result 152. The quantum simulation result 152 may be a representation of at least a component of a state of the state vector (e.g., a final or non-final state) for the quantum computing circuit (e.g., quantum computing component 114). For example, the quantum simulation result 152 may include, but is not limited to, an expectation value of the original quantum computing circuit, a sample representing at least a portion of one or more product states of the state vector, a measurement of a quantum state, and/or a norm or other statistics representative of at least a component of the state. The quantum simulation result 152 may comprise measurements of a state of one or more qubits.

In some embodiments, the quantum simulation result 152 may be read as an input by the classical simulator 142 and used in the process of computing the classical computing output 156. The simulation output(s) 160 generated by processing of the hybrid computing component 110 using the quantum simulation computing platform 120 may comprise the quantum simulation result 152 and/or the classical computing output 156. In some embodiments, the simulation output(s) 160 may be fed to the user device 116 for review and/or further analysis.

As previously mentioned, when a simulation of a quantum system is run on a classical computer platform, the classical computer platform is essentially executing emulations of quantum processes. However, for quantum circuits comprising smaller systems (e.g., less that approximately 26 qubits), operational overhead related latency factors (e.g., such as latencies associated with memory operations) begin to become the dominant factors contributing to quantum circuit simulation execution times. As such, with one or more of the embodiments of this disclosure, the quantum state of a circuit is partitioned into one or more state vector partition candidates that form sparse partitions. As more particularly illustrated with respect to FIG. 2, the state vector partition candidate generator 138 and the state vector partition optimization engine 140 may operate in conjunction with each other to produce a set of state vector partitions 136 based on refining sparse state partitions that avoid memory allocations and read/write operations for state elements not represented in a respective partition, eliminating memory (or other overhead) related latencies for processing data corresponding to state elements that play no substantive part in computing the state elements that are represented in that state partition.

Figure 2:
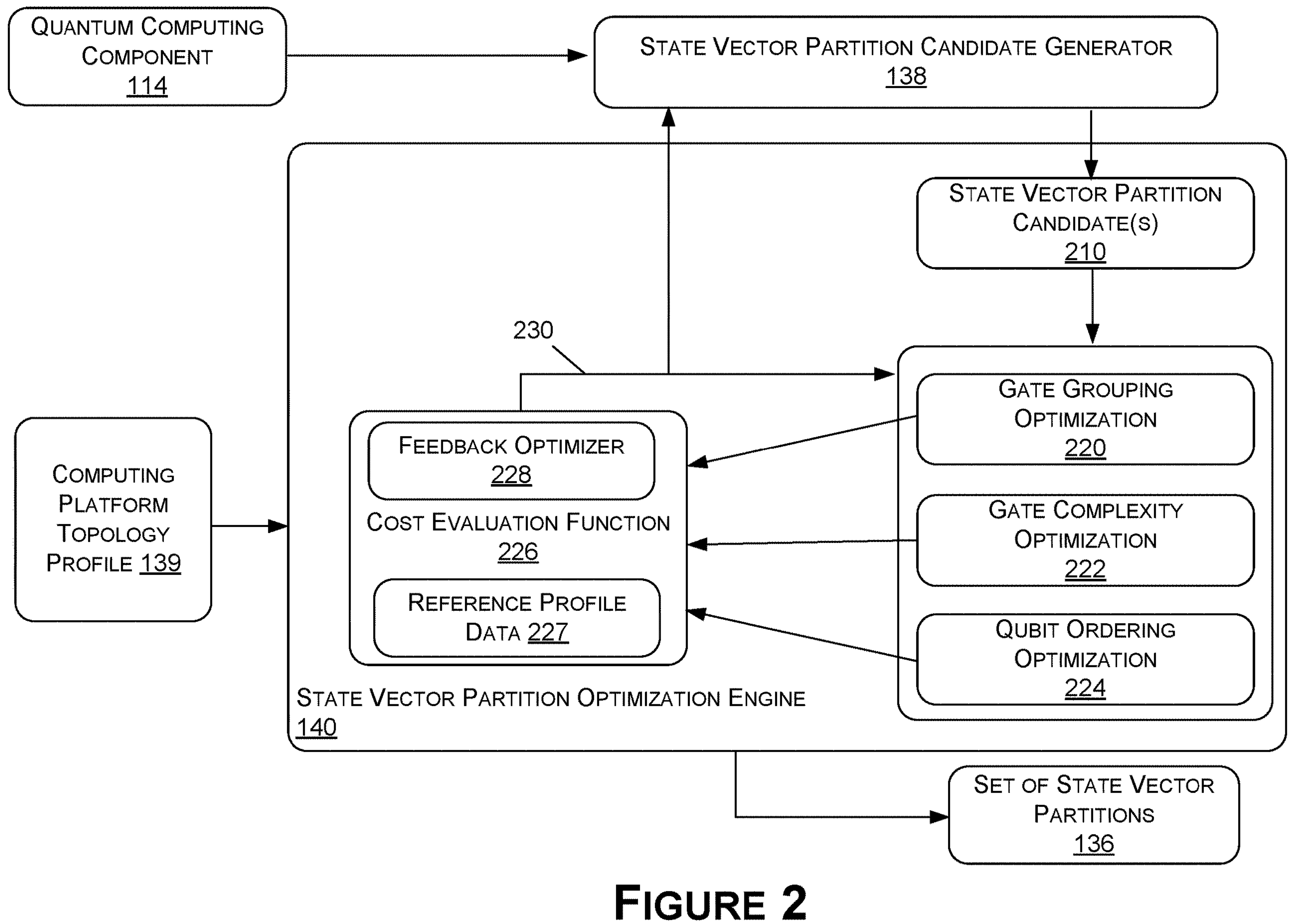
FIG. 2 is an illustration of an example flow diagram for optimizing simulation of quantum computing circuits using sparse state partitioning, in accordance with some embodiments of the present disclosure.

Referring now to FIG. 2, FIG. 2 illustrates the quantum state simulation engine 130 with respect to the computing platform topology profile 139, state vector partition candidate generator 138 and state vector partition optimization engine 140. The state vector partition optimization engine 140, in some embodiments, may be integrated with the state vector partition candidate generator 138.

In some embodiments, state vector partition candidates 210 may be initially determined by the state vector partition candidate generator 138 based on a representation of a quantum circuit described by the quantum computing component 114 and evaluation of product states produced by applying gates of that quantum circuit to state elements, and identifying sparsity preserving states, with the goal of dividing the quantum state of the quantum computing component 114 quantum circuit into pieces that can be distributed sparsely across an arbitrary cluster of processing devices, such as the processing devices of quantum circuit simulator 146, for example.

The quantum state of a qubit may be modeled as a complex state vector in a Hilbert space having a length of 1. For example, a qubit may have a value of $$|0\rangle = \begin{bmatrix} 1 \\ 0 \end{bmatrix} \text{ or } |1\rangle = \begin{bmatrix} 0 \\ 1 \end{bmatrix}.$$

During execution of a quantum circuit, the actual qubit state of any given qubit in a system is unknown, but may be expressed as $|\phi\rangle = \alpha|0\rangle + \beta|1\rangle$ where $|\alpha|^2$ is the probability of the qubit's state being $|0\rangle$, and $|\beta|^2$ is the probability of the qubit's state being $|1\rangle$. A quantum system of n qubits in a product state may be represented as follows:

$$|\psi\rangle = |\phi\rangle_0 \otimes |\phi\rangle_1 \otimes |\phi\rangle_2 \ \ldots \ \otimes |\phi\rangle_{n-1}$$

where $|\phi\rangle_i$ is a single-qubit state associated with the i-th site, or more formally:

$$|\phi\rangle_i = a_j^{(i)} |j\rangle$$

where $$a_j^{(i)} \in \mathbb{C}$$

and $|j\rangle$ is a single-site basis state. Generally speaking, the quantum state vector comprises a list of coefficients that specify the weights of the individual product states.

Figure 3:
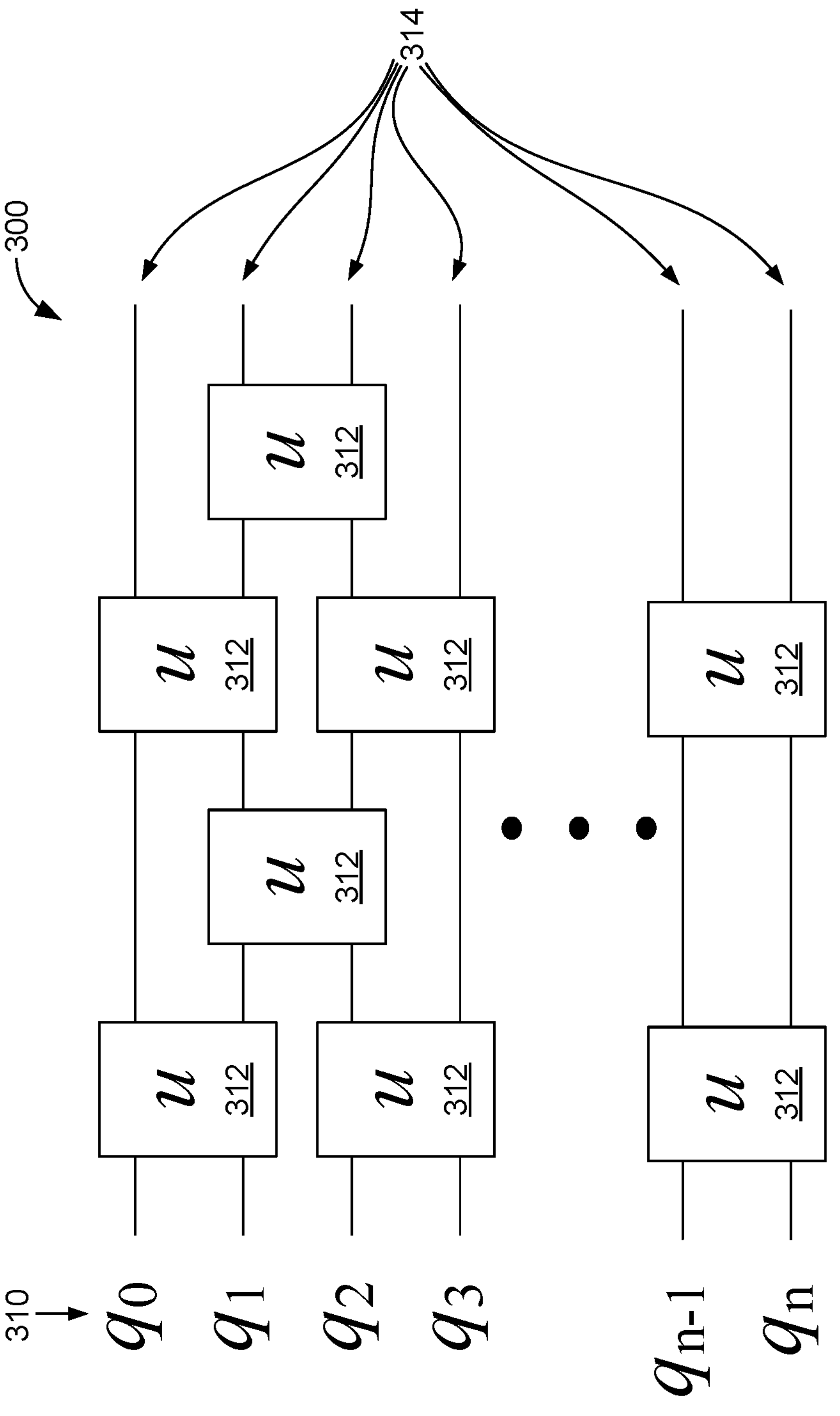
FIG. 3 illustrates an generalized example of a quantum computing circuit for simulation using sparse state partitioning, in accordance with some embodiments of the present disclosure.

As an example, FIG. 3 illustrates a generalized example of a quantum computing circuit 300 that may be evaluated and/or simulated by the quantum simulation computing platform 120. Quantum computing circuit 300, comprises an "n"-qubit system of qubits $q_0, q_1, q_2, q_3 \ldots q_n$. as illustrated at 310. As the example quantum computing circuit 300 is executed, each of the qubits $q_0, q_1, q_2, q_3 \ldots q_n$ is operated on according to one or more quantum gates 312 positioned along a respective circuit path 314 for a respective qubit. Examples of quantum gates include, but are not limited to, identity gates, Pauli gates, controlled gates, phase shift gates, Hadamard gates, swap gates, Toffoli gates and Deutsch gates. It should be noted that the number of qubits 310 and particular configuration of quantum gates 312 and circuit paths 314 shown in FIG. 3 are provided for the purpose of illustrating a structure of a quantum circuit, and are not limiting features of embodiments of this disclosure. Embodiments may be applied to other quantum computing circuits having state vectors, quantum operators and circuit path configurations differing from those shown in the various figures illustrated herein. A quantum operation performed by a quantum gate 312 may involve just a single qubit (and therefore be modeled as a 2×2 gate matrix), or involve some number "m" qubits of the "n" qubits 310 (and accordingly be modeled as a $2^m \times 2^m$ gate matrix). Moreover, a quantum gate 312 may manipulate the state of one qubit based on the state of another qubit. The state vector ψ of quantum computing circuit 300 at any given point along the execution path of the quantum computing circuit 300 may represent the cumulative operations performed by quantum gates 312 on each qubit 210 from their initial condition to that given point along the circuit execution paths 314. The "depth" of a qubit's circuit path 314 may be based on the number of quantum gates 312 that operate on that qubit as the quantum computing circuit 300 is executed.

Figures 4, 5:
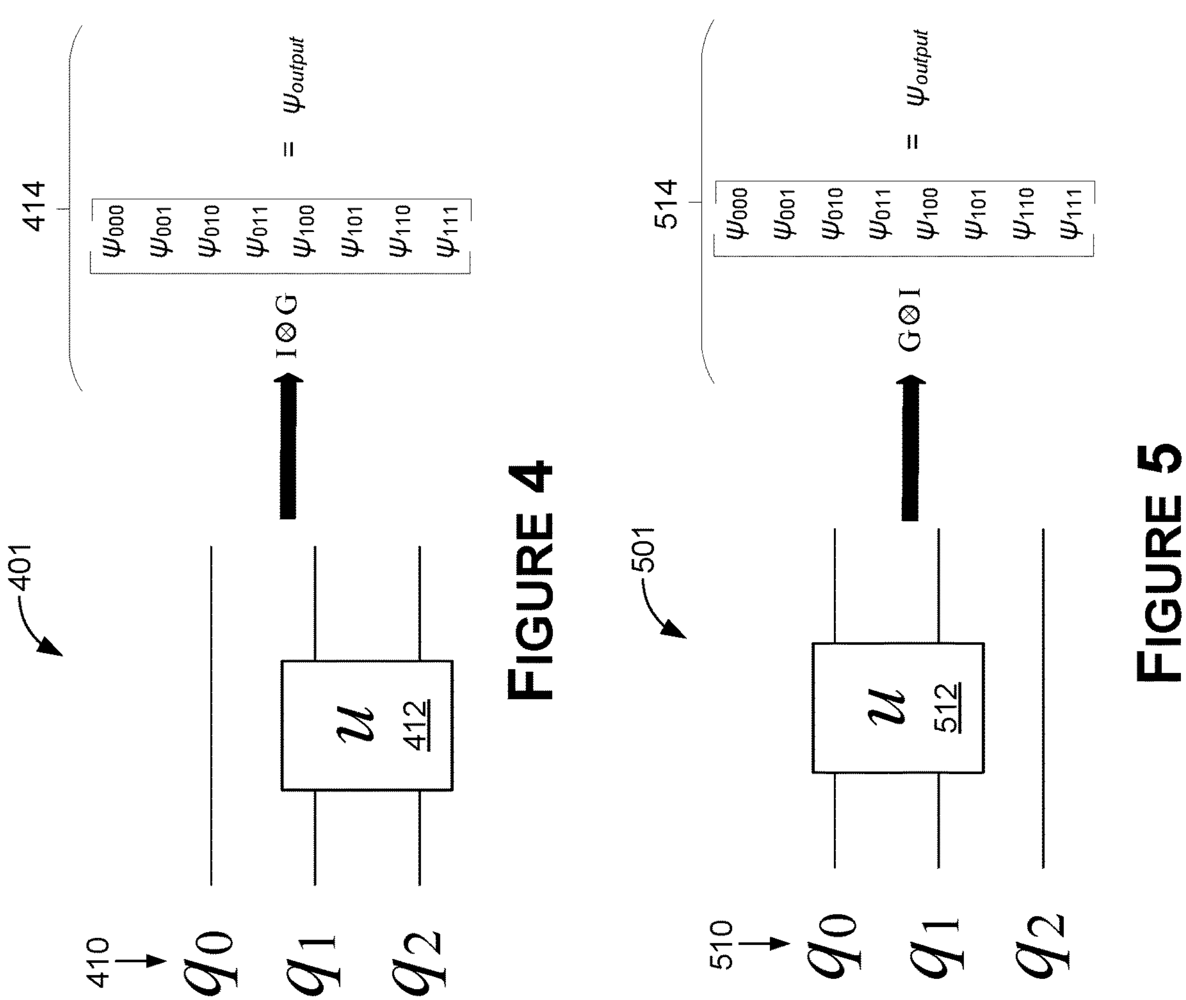
FIGS. 4 and 5 illustrate examples of quantum computing circuits for simulation using sparse state partitioning, in accordance with some embodiments of the present disclosure.

To consider a basic example, FIG. 4 illustrates a 3-qubit quantum circuit 401 having qubits $q_0$, $q_1$, and $q_2$ as shown at 410. The quantum state of 3-qubit quantum circuit 401 may be expressed as $\psi_{ijk}$ where the index coefficient "i" represents qubit $q_0$, the index coefficient "j" represents qubit $q_1$, and the index coefficient "k" represents qubit $q_2$. Accordingly, for 3-qubit quantum circuit 401, there are eight possible permutations of state vector elements (values) corresponding to these 3-qubits, which may be expressed in a vector form as:

$$[\psi_{000} \ \psi_{001} \ \psi_{010} \ \psi_{011} \ \psi_{100} \ \psi_{101} \ \psi_{110} \ \psi_{111}]^T$$

As discussed above, quantum gates are used in a quantum circuit to manipulate quantum state elements and may be represented mathematically by unitary matrices. For example, a gate which acts on n qubits may be represented by a $2^n \times 2^n$ unitary matrix. As shown in FIG. 4, quantum circuit 401 may include a 2-qubit gate 412 that operates on qubit $q_1$ and qubit $q_2$, but not qubit $q_0$ (e.g., such that qubits $q_1$ and $q_2$ may interact with each other but not with $q_0$). To compute the effect of quantum gate 412 on the quantum system 401, a tensor product may be computed from the product of a one qubit identity gate (I) (e.g., a 2-dimensional identity matrix) with the 2-qubit gate 412 (G) and expressed by:

$$I \otimes G = \begin{bmatrix} 1 & 0 \\ 0 & 1 \end{bmatrix} \otimes \begin{bmatrix} G_{00} & G_{01} & G_{02} & G_{03} \\ G_{10} & G_{11} & G_{12} & G_{13} \\ G_{20} & G_{21} & G_{22} & G_{23} \\ G_{30} & G_{31} & G_{32} & G_{33} \end{bmatrix} =$$

$$\begin{bmatrix} G_{00} & G_{01} & G_{02} & G_{03} & 0 & 0 & 0 & 0 \\ G_{10} & G_{11} & G_{12} & G_{13} & 0 & 0 & 0 & 0 \\ G_{20} & G_{21} & G_{22} & G_{23} & 0 & 0 & 0 & 0 \\ G_{30} & G_{31} & G_{32} & G_{33} & 0 & 0 & 0 & 0 \\ 0 & 0 & 0 & 0 & G_{00} & G_{01} & G_{02} & G_{03} \\ 0 & 0 & 0 & 0 & G_{10} & G_{11} & G_{12} & G_{13} \\ 0 & 0 & 0 & 0 & G_{20} & G_{21} & G_{22} & G_{23} \\ 0 & 0 & 0 & 0 & G_{30} & G_{31} & G_{32} & G_{33} \end{bmatrix}$$

where the resulting 8×8 product matrix represents what may be referred to as the global operator—a full product space where each individual qubit has a local space represented within the matrix by two coefficients. The resulting output state, $\psi_{output}$ resulting from applying the 2-bit gate to the 3-qubit quantum circuit 401, may be expressed using matrix multiplication (as shown at 414) as:

$$\begin{bmatrix} G_{00} & G_{01} & G_{02} & G_{03} & 0 & 0 & 0 & 0 \\ G_{10} & G_{11} & G_{12} & G_{13} & 0 & 0 & 0 & 0 \\ G_{20} & G_{21} & G_{22} & G_{23} & 0 & 0 & 0 & 0 \\ G_{30} & G_{31} & G_{32} & G_{33} & 0 & 0 & 0 & 0 \\ 0 & 0 & 0 & 0 & G_{00} & G_{01} & G_{02} & G_{03} \\ 0 & 0 & 0 & 0 & G_{10} & G_{11} & G_{12} & G_{13} \\ 0 & 0 & 0 & 0 & G_{20} & G_{21} & G_{22} & G_{23} \\ 0 & 0 & 0 & 0 & G_{30} & G_{31} & G_{32} & G_{33} \end{bmatrix} \begin{bmatrix} \psi_{000} \\ \psi_{001} \\ \psi_{010} \\ \psi_{011} \\ \psi_{100} \\ \psi_{101} \\ \psi_{110} \\ \psi_{110} \end{bmatrix} =$$

$$\begin{bmatrix} G_{00}\psi_{000} + G_{01}\psi_{001} + G_{02}\psi_{010} + G_{03}\psi_{011} \\ G_{10}\psi_{000} + G_{11}\psi_{001} + G_{12}\psi_{010} + G_{13}\psi_{011} \\ G_{20}\psi_{000} + G_{21}\psi_{001} + G_{22}\psi_{010} + G_{23}\psi_{011} \\ G_{30}\psi_{000} + G_{31}\psi_{001} + G_{32}\psi_{010} + G_{33}\psi_{011} \\ G_{00}\psi_{100} + G_{01}\psi_{101} + G_{02}\psi_{110} + G_{03}\psi_{111} \\ G_{10}\psi_{100} + G_{11}\psi_{101} + G_{12}\psi_{110} + G_{13}\psi_{111} \\ G_{20}\psi_{100} + G_{21}\psi_{101} + G_{22}\psi_{110} + G_{23}\psi_{111} \\ G_{30}\psi_{100} + G_{31}\psi_{101} + G_{32}\psi_{110} + G_{33}\psi_{111} \end{bmatrix}$$

The column vector output, $\psi_{output}$, from this vector matrix multiplication is the new quantum state resulting from application of the 2-qubit gate 412 that operates on qubit $q_1$ and $q_2$ of the 3-qubit quantum circuit 401.

In some embodiments, the state vector partition candidates 210 may be generated based on the premise that not every coefficient of a gate matrix is necessarily used to compute every state element of the state $\psi_{ijk}$, which may be referred to as the concept of state sparsity. The effects of a quantum gate's operations across a circuit's state may therefore be computed by distributing computations corresponding to state partitions in a manner that preserves sparsity, where those partitions correspond to slices of the product space in which the quantum system resides. As a result, each state partition of a given state vector partition candidate 210 may be computed on a processing device (e.g., a single GPU) using only a fraction of the memory that would be used to compute the full state (e.g., the full state of $\psi_{ijk}$).

For example, the quantum circuit 401 may be distributed into various potential state vector partition candidates 210 where each state partition candidate distributes the quantum state of quantum circuit 401 into two state partitions. As an example of a first potential partition candidate, the $\psi_{ijk}$ state may be distributed into a first state partition, $\psi_{Partition\ 0}$ based on a first sparse state vector template represented by $[\psi_{000}\ \psi_{001}\ \psi_{010}\ \psi_{011}\ 0\ 0\ 0\ 0]^T$ that computes updates TO STATE ELEMENTS $\psi_{000}\ \psi_{001}\ \psi_{010}\ \psi_{011}$ DUE TO OPERATIONS FROM QUANTUM GATE 412, AND A SECOND state partition $\psi_{Partition\ 1}$ using a second sparse state vector template represented by $[0\ 0\ 0\ 0\ \psi_{100}\ \psi_{101}\ \psi_{110}\ \psi_{111}]^T$ that computes updates to state elements $\psi_{100}\ \psi_{101}\ \psi_{110}\ \psi_{110}$ due to operations from quantum gate 412. In other words, computations corresponding to zero value elements of a template may be avoided (e.g., skipped) when processing partitions obtained from these sparse state vector templates, advantageously obtaining sparse partitions from otherwise dense systems, as further discussed below. That is, with the sparsity preserving approaches described herein, the number of nonzero elements in a partition, before and after applying an operation, may be fixed and the index positions of the nonzero elements is not changed. This state partitioning of the system of quantum circuit 410 into $\psi_{Partition\ 0}$ and $\psi_{Partition\ 1}$ may be expressed as:

$$[I \otimes G] \begin{bmatrix} \psi_{000} \\ \psi_{001} \\ \psi_{010} \\ \psi_{011} \\ 0 \\ 0 \\ 0 \\ 0 \end{bmatrix} =$$

$$\begin{bmatrix} G_{00}\psi_{000} + G_{01}\psi_{001} + G_{02}\psi_{010} + G_{03}\psi_{011} \\ G_{10}\psi_{000} + G_{11}\psi_{001} + G_{12}\psi_{010} + G_{13}\psi_{011} \\ G_{20}\psi_{000} + G_{21}\psi_{001} + G_{22}\psi_{010} + G_{23}\psi_{011} \\ G_{30}\psi_{000} + G_{31}\psi_{001} + G_{32}\psi_{010} + G_{33}\psi_{011} \\ 0 \\ 0 \\ 0 \\ 0 \end{bmatrix} == > [G] \begin{bmatrix} \psi_{000} \\ \psi_{001} \\ \psi_{010} \\ \psi_{011} \end{bmatrix} = \psi_{Partition\ 0}$$

and $$[I \otimes G] \begin{bmatrix} 0 \\ 0 \\ 0 \\ 0 \\ \psi_{100} \\ \psi_{101} \\ \psi_{110} \\ \psi_{110} \end{bmatrix} =$$

$$\begin{bmatrix} 0 \\ 0 \\ 0 \\ 0 \\ G_{00}\psi_{100} + G_{01}\psi_{101} + G_{02}\psi_{110} + G_{03}\psi_{111} \\ G_{10}\psi_{100} + G_{11}\psi_{101} + G_{12}\psi_{110} + G_{13}\psi_{111} \\ G_{20}\psi_{100} + G_{21}\psi_{101} + G_{22}\psi_{110} + G_{23}\psi_{111} \\ G_{30}\psi_{100} + G_{31}\psi_{101} + G_{32}\psi_{110} + G_{33}\psi_{111} \end{bmatrix} == > [G] \begin{bmatrix} \psi_{100} \\ \psi_{101} \\ \psi_{110} \\ \psi_{111} \end{bmatrix} = \psi_{Partition\ 1}$$

The state partitions $\psi_{Partition\ 0}$ and $\psi_{Partition\ 1}$ in this example resulting from the selection of these sparse state vector templates represent "sparse" state partitions because one or more of the state vector elements of the $\psi_{ijk}$ state vector are zeroed (e.g., absent) in each state partition. That is, for each state partition, only a fraction of the total number of state elements from $\psi_{ijk}$ may be used to arrive at a complete computation of state elements within that partition. Memory allocations and read/write operations by quantum circuit simulator 146 when simulating $\psi_{Partition\ 0}$ and $\psi_{Partition\ 1}$ may be avoided for the zeroed state elements not represented in that respective partition, eliminating memory (or other overhead) related latencies for processing data corresponding to state elements that play no substantive part in computing the state elements that are represented in that state partition. Increased efficiency is thus obtainable in simulating this small system quantum circuit 401 using the embodiments described herein by avoiding latencies within the simulation platform 120 hardware. Moreover, given these partitions, communication between the partitions is not needed to compute any of the state elements. The state vector partition candidate generator 138 may therefor include this distribution as a state vector partition candidate 210 for further cost evaluation and/or optimization by the state vector partition optimization engine 140 using the available computing platform topology defined by computing platform topology profile 139.

It should be appreciated that for a given particular quantum circuit, more than one potential partition candidate may be generated. For example, given the same quantum circuit 401 with quantum gate 412 operating on qubits $q_1$ and $q_2$, the state vector may be distributed into a different first partition, $\psi_{Partition\ 0}$ using another first sparse state vector template represented by $[\psi_{000}\ 0\ \psi_{010}\ 0\ \psi_{100}\ 0\ \psi_{110}\ 0]^T$ that computes updates to state elements $\psi_{000}\ \psi_{010}\ \psi_{100}\ \psi_{110}$ due to operations from gate 412, and a different second partition $\psi_{Partition\ 1}$ using another second sparse state vector template represented by $[0\ \psi_{001}\ 0\ \omega_{011}\ 0\ \psi_{101}\ 0\ \psi_{111}]^T$ that computes updates to state $\psi_{001}\ \psi_{011}\ \psi_{101}\ \psi_{111}$ due to operations from gate 412. This alternative state partitioning of the 3-qubit system of quantum circuit 401 may be expressed as:

$$[I \otimes G]\begin{bmatrix}\psi_{000}\\0\\\psi_{010}\\0\\\psi_{100}\\0\\\psi_{110}\\0\end{bmatrix} =$$

$$\begin{bmatrix} G_{00}\psi_{000}+G_{02}\psi_{010}+G_{00}\psi_{100}+G_{02}\psi_{110}\\0\\G_{10}\psi_{000}+G_{12}\psi_{010}+G_{10}\psi_{100}+G_{12}\psi_{110}\\0\\G_{20}\psi_{000}+G_{22}\psi_{010}+G_{20}\psi_{100}+G_{22}\psi_{110}\\0\\G_{30}\psi_{000}+G_{32}\psi_{010}+G_{30}\psi_{100}+G_{32}\psi_{110}\\0\end{bmatrix} == > [G]\begin{bmatrix}\psi_{000}\\\psi_{010}\\\psi_{100}\\\psi_{110}\end{bmatrix} = \psi_{Partition\ 0}$$

and $$[I \otimes G]\begin{bmatrix}0\\\psi_{001}\\0\\\psi_{011}\\0\\\psi_{101}\\0\\\psi_{111}\end{bmatrix} =$$

$$\begin{bmatrix} G_{00}\psi_{001}+G_{02}\psi_{011}+G_{00}\psi_{101}+G_{02}\psi_{111}\\0\\G_{10}\psi_{001}+G_{12}\psi_{011}+G_{10}\psi_{101}+G_{12}\psi_{111}\\0\\G_{20}\psi_{001}+G_{22}\psi_{011}+G_{20}\psi_{101}+G_{22}\psi_{111}\\0\\G_{30}\psi_{001}+G_{32}\psi_{011}+G_{30}\psi_{101}+G_{32}\psi_{111}\\0\end{bmatrix} == > [G]\begin{bmatrix}\psi_{001}\\\psi_{011}\\\psi_{101}\\\psi_{111}\end{bmatrix} = \psi_{Partition\ 1}$$

Like the previous example, these state partitions $\psi_{Partition\ 0}$ and $\psi_{Partition\ 1}$ also represent "sparse" state partitions because one or more of the state vector elements of the $\psi_{ijk}$ state vector are zeroed (e.g., absent) in each state partition. That is, for each state partition, only a fraction of the total number of state elements from $\psi_{ijk}$ may be used to arrive at a complete computation of state elements within that partition. The state vector partition candidate generator 138 may therefor include this distribution as a state vector partition candidate 210 for further cost evaluation and/or optimization by the state vector partition optimization engine 140 using the available computing platform topology defined by computing platform topology profile 139.

To consider another basic example, FIG. 5 illustrates another 3-qubit quantum circuit 501 having qubits $q_0$, $q_1$, and $q_2$ as shown at 510. The quantum state of 3-qubit quantum circuit 501 may be expressed as $\psi_{ijk}$ where the index coefficient "i" represents qubit $q_0$, the index coefficient "j" represents qubit $q_1$, and the index coefficient "k" represents qubit $q_2$. Accordingly, for 3-qubit quantum circuit 501, there are eight possible permutations of state vector elements (values) corresponding to these 3-qubits, which may be expressed in a vector form as:

$$[\psi_{000}\ \ \psi_{001}\ \ \psi_{010}\ \ \psi_{011}\ \ \psi_{100}\ \ \psi_{101}\ \ \psi_{110}\ \ \psi_{111}]^T$$

As shown in FIG. 5, quantum circuit 501 may include a 2-qubit gate 512 that operates on qubit $q_0$ and qubit $q_1$, but not qubit $q_2$ (e.g., such that qubits $q_0$ and $q_1$ may interact with each other but not with $q_2$). To compute the effect of quantum gate 512 on the quantum system 501, a tensor product may be computed from the product of the 2-qubit gate 512 (G) with a one qubit identity gate (I) (e.g., a 2-dimensional identity matrix) expressed by:

$$G \otimes I = \begin{bmatrix} G_{00} & G_{01} & G_{02} & G_{03}\\ G_{10} & G_{11} & G_{12} & G_{13}\\ G_{20} & G_{21} & G_{22} & G_{23}\\ G_{30} & G_{31} & G_{32} & G_{33}\end{bmatrix} \otimes \begin{bmatrix}1 & 0\\0 & 1\end{bmatrix} =$$

$$\begin{bmatrix} G_{00} & 0 & G_{01} & 0 & G_{02} & 0 & G_{03} & 0\\ 0 & G_{00} & 0 & G_{01} & 0 & G_{02} & 0 & G_{03}\\ G_{10} & 0 & G_{11} & 0 & G_{12} & 0 & 0G_{13} & 0\\ 0 & G_{10} & 0 & G_{11} & 0 & G_{12} & 0 & G_{13}\\ G_{20} & 0 & G_{21} & 0 & G_{22} & 0 & G_{23} & 0\\ 0 & G_{20} & 0 & G_{21} & 0 & G_{22} & 0 & G_{23}\\ G_{30} & 0 & G_{31} & 0 & G_{32} & 0 & G_{33} & 0\\ 0 & G_{30} & 0 & G_{31} & 0 & G_{32} & 0 & G_{33}\end{bmatrix}$$

where the resulting 8×8 product matrix represents what may be referred to as the global operator-a full product space where each individual qubit has a local space represented within the matrix by two coefficients. The resulting output state, $\psi_{output}$ resulting from applying the 2-bit gate to the 3-qubit quantum circuit 501, may be expressed using matrix multiplication (as shown at 514). For this example operation of quantum gate 512, the $\psi_{ijk}$ may be distributed into a first partition, $\psi_{Partition\ 0}$ using a first sparse state vector template represented by $[\psi_{000}\ 0\ \psi_{010}\ 0\ \psi_{100}\ 0\ \psi_{110}\ 0]^T$ that computes updates to state elements $\psi_{000}\ \psi_{010}\ \psi_{100}\ \psi_{110}$, and a second partition $\psi_{Partition\ 1}$ using a second sparse state vector template represented by $[0\ \psi_{001}\ 0\ \psi_{011}\ 0\ \psi_{101}\ 0\ \psi_{111}]^T$ that computes updates to state $\psi_{001}\ \psi_{011}\ \psi_{101}\ \psi_{111}$, which may be expressed as follows:

$$[G \otimes I]\begin{bmatrix}\psi_{000}\\0\\\psi_{010}\\0\\\psi_{100}\\0\\\psi_{110}\\0\end{bmatrix} =$$

$$\begin{bmatrix} G_{00}\psi_{000}+G_{01}\psi_{010}+G_{02}\psi_{100}+G_{03}\psi_{110}\\0\\G_{10}\psi_{000}+G_{11}\psi_{010}+G_{12}\psi_{100}+G_{13}\psi_{110}\\0\\G_{20}\psi_{000}+G_{21}\psi_{010}+G_{22}\psi_{100}+G_{23}\psi_{110}\\0\\G_{30}\psi_{000}+G_{31}\psi_{010}+G_{32}\psi_{100}+G_{33}\psi_{110}\\0\end{bmatrix} == > [G]\begin{bmatrix}\psi_{000}\\\psi_{010}\\\psi_{100}\\\psi_{110}\end{bmatrix} = \psi_{Partition\ 0}$$

-continued and $$[G\otimes I]\begin{bmatrix}0\\ \psi_{001}\\ 0\\ \psi_{011}\\ 0\\ \psi_{101}\\ 0\\ \psi_{111}\end{bmatrix}=$$

$$\begin{bmatrix}G_{00}\psi_{001}+G_{01}\psi_{011}+G_{02}\psi_{101}+G_{03}\psi_{111}\\ 0\\ G_{10}\psi_{001}+G_{11}\psi_{011}+G_{12}\psi_{101}+G_{13}\psi_{111}\\ 0\\ G_{20}\psi_{001}+G_{21}\psi_{011}+G_{22}\psi_{101}+G_{23}\psi_{111}\\ 0\\ G_{30}\psi_{001}+G_{31}\psi_{011}+G_{32}\psi_{101}+G_{33}\psi_{111}\\ 0\end{bmatrix} == > [G]\begin{bmatrix}\psi_{001}\\ \psi_{011}\\ \psi_{101}\\ \psi_{111}\end{bmatrix}=\psi_{Partition\ 1}$$

The state partitions $\psi_{Partition\ 0}$ and $\psi_{Partition\ 1}$ in this example resulting from the selection of these sparse state vector templates again represent sparse state partitions. The state vector partition candidate generator 138 may therefor include this distribution as a state vector partition candidate 210 for further cost evaluation and/or optimization by the state vector partition optimization engine 140 using the available computing platform topology defined by computing platform topology profile 139. However, for quantum circuit 501, distribution into a first partition, $\psi_{Partition\ 0}$ using a first sparse state vector template represented by $[\psi_{000}\ \psi_{001}\ \psi_{010}\ \psi_{011}\ 0\ 0\ 0\ 0]^T$ that computes updates to state elements $\psi_{000}\ \psi_{001}\ \psi_{010}\ \psi_{011}$, and a second partition $\psi_{Partition\ 1}$ using a second sparse state vector template represented by $[0\ 0\ 0\ 0\ \psi_{100}\ \psi_{101}\ \psi_{110}\ \psi_{111}]^T$ that computes updates to state $\psi_{100}\ \psi_{101}\ \psi_{110}\ \psi_{110}$, produces non-sparse state partitions. For example, $$[G\otimes I]\begin{bmatrix}\psi_{000}\\ \psi_{001}\\ \psi_{010}\\ \psi_{011}\\ 0\\ 0\\ 0\\ 0\end{bmatrix}=\begin{bmatrix}G_{00}\psi_{000}+G_{01}\psi_{010}\\ G_{00}\psi_{001}+G_{01}\psi_{011}\\ G_{10}\psi_{000}+G_{11}\psi_{010}\\ G_{10}\psi_{001}+G_{11}\psi_{011}\\ G_{20}\psi_{000}+G_{21}\psi_{010}\\ G_{20}\psi_{001}+G_{21}\psi_{011}\\ G_{30}\psi_{000}+G_{31}\psi_{010}\\ G_{30}\psi_{000}+G_{31}\psi_{011}\end{bmatrix}$$

represents a non-sparse distribution of the original set of state elements. Memory related latencies are not avoided to the degree as provided by a sparse distribution. Moreover, a complete result is not computed for any of the state entries within this state partition, but only partially computed. The state vector partition candidate generator 138 may therefor determine not to include this distribution as a state vector partition candidate 210. Alternatively, the state vector partition candidate generator 138 may determine to proceed and include this distribution as a state vector partition candidate 210, even though it is not a sparse distribution, for further cost evaluation and cost comparison to other potential partitions of this circuit.

As further explained below, in quantum circuits, qubit ordering may be arbitrarily arranged into any order deemed more computationally convenient. That is, the example 3-qubit quantum circuit 401 in FIG. 4 may have a more limited number of potential sparse partitions for producing state vector partition candidates 210 than the 3-qubit quantum circuit 401 in FIG. 5. That said, in some embodiment the state vector partition candidate generator 138 may reorder qubits for quantum circuit 501 (e.g., swapping the positions of $q_0$ to $q_1$, $q_1$ to $q_2$, and $q_2$ to $q_0$) when generating state vector partition candidates 210 to essentially translate quantum circuit 501 into quantum circuit 401 in order to produce additional possible state partitions 210 to feed to the state vector partition optimization engine 140.

The example quantum circuits 401 and 501 described above illustrate a 3-qubit system for illustrative purposes. In embodiments, state partitioning may be performed by the state vector partition candidate generator 138 on a quantum circuit including any number of qubits. The state vector partition candidate generator 138 may distribute into state partitions the quantum state elements for a quantum circuit having any number of qubits, as well as any number of gates operating on any one or more of those qubits. Further, the state vector partition candidate generator 138 may produce state vector partition candidates 210 that distribute the state of the quantum circuit into different numbers of state partitions. For example, a state may be distributed into two state partitions (such as in the examples above) to produce a state vector partition candidate 210. A state may be distributed across a greater number of state partitions (e.g., such as 4, 8 or 16 partitions) to produce a state vector partition candidate 210. In some embodiments, the number of partitions selected by the state vector partition candidate generator 210 may be determined as a function of $2^n$ where n is any integer $n\geq 1$. As an example, the state vector partition candidate generator 138 may generate a first state vector partition candidate 210 for a quantum circuit comprising a first number of state partitions (e.g., two), and second state vector partition candidate 210 for the same input quantum circuit comprising a second number of state partitions (e.g., four). State vector partition optimization engine 140, in some embodiments, may perform a cost evaluation on both candidates to determine which is the most efficiently simulated (e.g., executed by the quantum circuit simulator 146) given the current computing platform topology.

Each of the state partitions of a state vector partition candidate 210 may include $2^k$ state elements that are a fractional subset (that is, less than all) of the complete state of the quantum circuit (e.g., corresponding to the quantum computing component 114) such that a sum of the state partitions reproduces the complete set of state elements of the state vector. In some embodiments, each partition's complement of $2^k$ state elements does not overlap with another partition's complement of $2^k$ state elements (e.g., $\psi_{Partition\ 0}$, $\psi_{Partition\ 1}$ . . . $\psi_{partition\ n}$ comprise mutually exclusive subsets of $\psi_{ijk}$). Moreover, in some embodiments, different numbers of state element may be distributed to different state partitions.

As previously mentioned, regardless of how the state is partitioned, each state partition of a state vector partition candidate 210 corresponds with a slice of the product space in which the qubit set of that quantum system resides. As long as the quantum gate operations acting on a state partition are conforming (e.g., the effects of the operations can be completely determined based on the state elements present within the partition) then a sparse state partition independently produces a complete result for the state elements included within that partition. In contrast, if quantum gate operations do not conform, the processing resource executing that partition computes a local contribution to the full state. Communication between processing resources of the quantum circuit simulator 146 is costly in terms of execution time and overhead latencies. Preserving sparsity when distributing a state of the quantum circuit for quantum computing component 114 into state partitions substantially avoids such communication.

As further shown in FIG. 2, in some embodiments, the state vector partition candidate generator 130 may feed one or more state vector partition candidates 210 into the state vector partition optimization engine 140. The state vector partition optimization engine 140 evaluates and/or scores the efficiency associated with executing each state vector partition candidate 210 for a given computing platform topology defined by the computing platform topology profile 139. The computing platform topology profile 139 may comprise a profile of the computing resources available to the quantum circuit simulator 146 for executing a simulation of a quantum circuit. For example, the quantum circuit simulator 146 may comprise processing devices that include any number of CPU(s), GPU(s), Quantum Processing Unit(s) (QPU(s)), and/or a combination thereof. The computing platform topology profile 139 may define the number and types of each available processing devices and/or other performance parameters (e.g., Teraflop ratings, memory capacity and/or data bus speeds). In some embodiments, the state vector partition optimization engine 140 may compute a score for a state vector partition candidate 210 based on evaluating which pairing of state partitions to processing devices produces a best efficiency (and/or an efficiency meeting a predefined threshold) for that state vector partition candidate 210.

The state vector partition optimization engine 140 may execute one or more of a gate grouping optimization 220, a gate complexity optimization 222, and/or a qubit ordering optimization 224 for individual state partitions of a state vector partition candidate. While the state vector partition candidate generator 138 evaluates the quantum circuit to produce sparse partition candidates that avoid communications, the gate grouping optimization 220, gate complexity optimization 222, and/or qubit ordering optimization 224 functions evaluate one or more partition candidates with respect to how they may be best optimized for simulation. Those refined versions of the state partitions may then be evaluated by a cost evaluation function 226 with respect to efficiency given the computing platform topology. In some embodiments, the state vector partition optimization engine 140 may compute the costs for a set of different state vector partition candidates, ranking each candidate by a cost score and/or determining which, if any, satisfy a cutoff cost threshold. In some embodiments, the state vector partition optimization engine 140 may operate as a closed loop optimizer, providing feedback to the state vector partition candidate generator 138, gate grouping optimization 220, gate complexity optimization 222, and/or qubit ordering optimization 224 to adjust one or more partitions of a state vector partition candidate 210 to attempt to iteratively converge on an optimized state vector partition candidate 210 that does satisfy the cutoff cost threshold.

Regarding the qubit ordering optimization 224, a goal of this function of the state vector partition optimization engine 140 is to adjust the order of significance of the qubits in a state partition to a more refined (e.g., optimized) configuration with respect to reducing communication requirements. For example, a qubit originally designated as qubit 0 in a state partition produced by the state vector partition candidate generator 138, may be decreased in significance (e.g., to qubit 7) to avoid communication due to applying a quantum gate operation. In other words, the locality of the operational sequences defined in a quantum circuit state partition affects the communication requirements to simulate that state partition. The ideal ordering may not be known when a state vector partition candidate 210 is first generated, but may be determined through an iterative optimization. In some embodiments, to enumerate a cost associated with a given qubit order, qubit ordering optimization 224 may estimate a qubit ordering score representing an estimate of the length of time the quantum circuit simulator 146 simulation platform would take to perform memory operations to communicate state coefficients within memory to perform a quantum gate operation. If that time exceeds a threshold, then the qubit ordering optimization 224 may determine which qubits are causing the need for the memory operations and determine if a different ordering of the qubits would call for fewer memory operations. Qubit ordering optimization 224 may thus adjust the qubit order to refine (e.g., optimize) a state partition produced by the state vector partition candidate generator 138, and produce a qubit ordering score for that partition as an input to the cost evaluation function 226.

Regarding the gate complexity optimization 222, a goal of this function of the state vector partition optimization engine 140 is to evaluate the computational intensity of implementing quantum gates of the quantum circuit on a state partition (e.g., floating-points operations per second (FLOPS) and/or memory operations). The gate complexity optimization 222 may thus compute a gate complexity score that is a function of FLOPS, memory operations, and/or communication requirements associated with implementing quantum gates of the quantum circuit on a state partition. In some embodiments, the gate complexity score may include independent indications of FLOPS, memory operations, and communication requirements that may be input for evaluation to the cost evaluation function 226. For example, the cost evaluation function 226 may determine that simulating a state partition that is more communication intensive may score higher for simulation on a CPU processing device of quantum circuit simulator 146 than a GPU processing device, while a state partition that needs relatively little communication may score higher for simulation on a GPU processing device of quantum circuit simulator 146 that has substantially more bandwidth available in its memory subsystem than the CPU processing device.

In some embodiments, the gate complexity of a quantum gate may be considered a representation of the degree of entanglement resulting in the implementation of a quantum gate. Generally speaking, the more diagonal the product space matrix produced by application of a gate is, the less complex that gate is considered. This is because, at least in part, a more diagonal product space matrix indicates that less communication is involved between state elements within that partition to compute the effects of the gate on the state elements. In some embodiments, gate complexity for a gate may be computed by the gate complexity optimization 222 using a singular value decomposition (SVD) or similar matrix factorization. The gate complexity score for a state partition under evaluation by the gate complexity optimization 222 may be computed as a function of the singular value decomposition results of the one or more gates operating on that state partition.

In some embodiments, the gate complexity optimization 222 further evaluates when the complexity of a gate may be reduced by splitting a gate into smaller and less complex component gates. For example, the gate complexity optimization 222 may evaluate a gate matrix to identify one or more operations performed by the gate that do not require any communication (such as an operation that only affects a single state element) or less communication than the original gate. Such operations may be extracted to form distinct gates. Thus, the overall gate complexity score associated with simulating that state partition may be optimized (e.g., reduced) because the complexity of gates remaining after gate splitting may be less than the complexity associated with the original gate before gate splitting.

Regarding the gate grouping optimization 220, a goal of this function of the state vector partition optimization engine 140 is to adjust the grouping of gates in a partition to a more refined (e.g., optimized) configuration with respect to reducing computational operations (e.g., FLOPs and/or memory operations). For example, for a given state partition, the gate grouping optimization 220 may determine that two or more separate gate operations may be accumulated into a single gate operation than can be simulated as a single gate operation more efficiently than individually simulating the original gate operations separately. In some embodiments, separate gate operations may be accumulated using matrix multiplication of the separate gate operations to define a composite gate, and then apply that resulting composite gate as an operation to the circuit instead of applying the separate gate operations.

For example, such a gate accumulation may be expressed as: $(G_0 \otimes I)(G_1 \otimes I) \ldots (G_n \otimes I)|\psi\rangle = (G \otimes I)|\psi+\rangle$ where $G = G_0 \times G_1 \times \ldots \times G_n$. The n−1 matrix multiplication operations to compute the accumulated G matrix may be less computationally intense than performing the n tensor product operations using the non-accumulated $G_0 \ldots G_n$. The gate grouping operation may thus accumulate a plurality of gate operations locally onto a particular qubit index and then apply the accumulated operation once, thereby reducing the number of times the simulating process will need to perform an operation and/or call a particular application programing interface (API). The gate grouping optimization 220 and gate complexity optimization 222 may represent opposing factors, to some degree, in some instances. For example, while accumulating gates may reduce the number of operations that need to be performed in a state partition, a composite gate formed from accumulation may represent an increase in gate complexity and/or communication. In some embodiments, the gate grouping optimization 220 may compute a gate grouping score, for example, based on the operations to process one or more composite gates generated from gate groupings as an input to the cost evaluation function 226.

In some embodiments, the cost evaluation function 226 of the state vector partition optimization engine 140 may receive the qubit ordering score, the gate complexity score, and/or the gate grouping scores for the state partitions included in a state vector partition candidate 210. Based on the score(s) and the computing platform topology profile 139, the cost evaluation function 226 may estimate an efficiency (e.g., a compute cost) for executing those state partitions of the state vector partition candidate 210 to simulate the quantum circuit of quantum computing component 114. As discussed above, the computing platform topology profile 139 may comprise a profile of the computing resources available to quantum circuit simulator 146 for executing a simulation of the quantum circuit. In addition to the number and types of processing devices (e.g., CPUs, GPUs, DPUs, hardware accelerators), the computing platform topology profile 139 may define factors that influence efficient execution of simulations, such as the speed and interconnects between nodes of the simulation platform, latencies in the time consumed to communicate between processors, available bandwidths between processors, and similar architectural factors. For example, a typical GPU may comprise one or more orders of magnitude of internal bandwidth to support high communication computations than a CPU. Based on the qubit ordering score, the gate complexity score, and/or the gate grouping score, the cost evaluation function 226 may determine (e.g., through an optimization algorithm) which permutation of the processing devices available to the quantum circuit simulator 146 results in the most efficient simulation of the quantum circuit using the state vector partition candidate 210. The cost evaluation function 226 may estimate an efficiency (e.g., a quantitative compute cost) that may be used to rank this state vector partition candidate 210 against other state vector partition candidates and/or determine if the state vector partition candidate 210 satisfies a cutoff cost threshold. In some embodiments, the efficiency estimate may include indications of simulation parameters such as, but not limited to, a time dissolution metric, a simulation time to complete score, a memory usage and/or a FLOP metric, for example. In some embodiments, when the state vector partition optimization engine 140 selects a state vector partition candidate 210 as a set of state vector partitions (e.g., quantum state vector partitions 136) to pass to the quantum circuit simulator 146, the state vector partition optimization engine 140 may pass the set of state vector partitions together with configuration information indicating assignments of individual state partitions that are to be scheduled on corresponding processing devices of the quantum circuit simulator 146.

In some embodiments, the cost evaluation function 226 may use reference profile data 227, derived at least in part using the computing platform topology profile 139 and/or quantum computing component 114, to generate a compute cost for a state vector partition candidate 210. The reference profile data 227 may comprise an inventory of standard quantum gate operations (e.g., based on determining an inventory of gate types present in the quantum circuit), wherein each standard quantum gate operation is cross-referenced to one or more pre-determined compute costs for executing that quantum gate operation on a processing device having a given configuration and/or specifications (e.g., processing speed, number of cores, bit depth, etc.). For example, the pre-determined compute costs may be determined based on empirical data that characterizes the execution of a gate on one or more processing device configurations defined by the computing platform topology profile 139. The cost evaluation function 226 may estimate a compute cost for a state vector partition candidate 210 by determining from the reference profile data 227 a cost for simulating a state partition, and/or based on the sum of costs of executing the gates within that state partition on one or more possible permutations of processing devices available to the quantum circuit simulator 146.

In some embodiments, the state vector partition candidate generator 138 may pre-emptively compute a set comprising multiple instances of state vector partition candidates 210, which may be individually evaluated and/or refined (e.g., optimized) by the state vector partition optimization engine 140 in batch. The cost evaluation function 226 may estimate a compute cost for the individual state vector partition candidates 210 and/or rank the multiple instances of state vector partition candidates 210. In some embodiments, the cost evaluation function 226 may determine which is the most efficient to execute on the quantum circuit simulator 146 based on the estimated compute cost, and pass that selected state vector partition candidate 210 as a set of state vector partitions to the quantum circuit simulator 146. In some embodiment, the cost evaluation function 226 may select a set of state vector partitions to pass to the quantum circuit simulator 146 based on determining that the state vector partition candidate 210 is the most efficient to execute based on the estimated compute cost and/or based on determining that the estimated compute cost satisfies the cutoff cost threshold.

In some embodiments, state vector partition candidates 210 can be iteratively evaluated and/or refined by the state vector partition optimization engine 140 using an optimization loop. In such an embodiment, the state vector partition candidate generator 138 may generate a state vector partition candidate 210 that is processed by the qubit order optimization 224, gate complexity optimization 222, and/or the gate grouping optimization 220 as discussed above, and the resulting qubit order score, gate complexity score, and/or gate grouping score processed by the cost evaluation function 226 to determine the compute score for that state vector partition candidate 210 in view of the computing platform topology profile. If the resulting compute score does not satisfy the cutoff cost threshold, the cost evaluation function 226 may generate a feedback (shown at 230) that triggers the generation of an updated iteration of the state vector partition candidate 210. For example, when the cost evaluation function 226 determines that state vector partition candidate 210 does not satisfy a cutoff cost threshold, a state vector partition candidate 210 may be adjusted (e.g., with respect to partition structure, gate grouping, gate complexity, and/or qubit ordering) and the updated state vector partition candidate 210 re-evaluated, with the processes repeating until a state vector partition candidate 210 is found that satisfies the cutoff cost threshold, or until it is determined that a state vector partition candidate 210 that does satisfy the cutoff cost threshold is not readily attainable (e.g., given the current computing platform topology for quantum circuit simulator 146).

In some embodiments, the feedback 230 may simply indicate that the evaluated state vector partition candidate 210 is inadequate. Based on that feedback 230, the state vector partition candidate generator 138 may generate a new proposed state vector partition candidate 210 (e.g., based on different sparse state vector templates and/or distributing the state into a different number of state partitions) and/or the gate grouping optimization 220, gate complexity optimization 222, and/or qubit ordering optimization 224 may respectively refine (e.g., optimize) a state vector partition candidate 210 based on different gate groupings, gate complexities and/or qubit ordering. The cost evaluation function 226 may then compute a compute cost for the updated state vector partition candidate 210 and similarly evaluate that compute cost against the cutoff cost threshold. The optimization loop may iteratively repeat in this manner until a state vector partition candidate 210 that satisfies the cutoff cost threshold is identified.

In some embodiments, the state vector partition optimization engine 140 may further comprise a feedback optimizer 228 that generates the feedback 230 based on an optimization algorithm. For example, the feedback optimizer 228 may input the compute cost estimated by the cost estimation function for the updated state vector partition candidate 210, and execute an optimization algorithm that generates feedback 230 to control the state vector partition optimization engine 140 (e.g., the state vector partition candidate generator 138, gate grouping optimization 220, gate complexity optimization 222, and/or qubit ordering optimization 224) to produce an adjusted state vector partition candidate 210 that results in an refined (e.g., optimized) qubit order score, gate complexity score, and/or gate grouping score, and that is expected to satisfy, or at least better converge on, the cutoff cost threshold. For example, the feedback optimizer 228, based on the estimated compute costs, may generate a feedback 230 indicating that the proposed state vector partition candidate 210 calls for using too much memory and/or takes too long to execute and the state vector partition candidate generator 138 and/or state vector partition optimization engine 140 may respond by generating a new proposed state vector partition candidate 210 that uses less memory and/or executes faster, by adjusting parameters such as the size of state vector partitions, qubit ordering, gate complexity, and/or gate grouping. The optimization loop may iteratively repeat in this manner until a state vector partition candidate 210 that satisfies the cutoff cost threshold is identified. In some embodiments, after one or more repeated iterations (e.g., after the number of iterations reaches a predefined threshold), the state vector partition optimization engine 140 may select a sub-optimal state vector partition candidate 210 as a set of state vector partitions for simulation that may not completely satisfy the cutoff cost threshold, but is at least within a predetermined tolerance of the cutoff cost threshold.

There are several different classes of optimization algorithms that the feedback optimizer 228 may implement to generate feedback 230 and iteratively adjust the state vector partition candidate 210 to attempt to satisfy the cutoff cost threshold (e.g., such as, but not limited to, brute force optimization, greedy optimization, branching optimization, and/or other optimization algorithms). For example, in some embodiments, the feedback optimizer 228 may implement brute force optimization. Using brute force optimization, the state vector partition optimization engine 140 may generate and process a set of state vector partition candidates 210 having different partition and/or qubit swapping combinations for the state based on all of the gates in the quantum circuit that fall within a maximum number of processing device nodes (e.g., which is hard capped) of the quantum circuit simulator 146. For the configurations of state vector partition candidates 210 that do not exceed a memory cap, the respective estimated computation time is recorded and the state vector partition optimization engine 140 selects the state vector partition candidate 210 with the shortest computation time to pass to the quantum circuit simulator 146 for execution. If two or more state vector partition candidates 210 are estimated as having the same computation time, then the state vector partition optimization engine 140 may default to selecting for simulation the state vector partition candidate 210 that uses the least memory to execute. Note that brute force optimization can be expected to produce a true best state vector partition candidate 210 for simulating the quantum circuit, but is a computationally expensive optimization algorithm to execute for large configuration spaces (e.g., quantum circuits that comprise many-qubit states and/or many gates).

In some embodiments, the feedback optimizer 228 may implement, for example and without limitation, a greedy optimization algorithm. Using greedy optimization, the state vector partition optimization engine 140 evaluates a first gate operation that is applied to the state elements within a state partition and selects a state vector partition candidate 210 and/or qubit ordering that minimizes the computational time given a maximum number of available processing device nodes of the quantum circuit simulator 146. If there is a tie for computation time, the greedy optimization algorithm selects the configuration that further minimizes memory. Note that the greedy optimization algorithm evaluation is based on the first gate operation performed within a state partition without consideration of the impact of the selecting that state vector partition candidate 210 would have on the operation of subsequently executed gates. The state partition configuration is then locked with respect to the first gate and the greedy optimization algorithm then progresses to evaluating the second gate that is applied to the state elements within a state partition. The same process is repeated on the second gate that was performed on the first gate, minimizing the computational time and/or the memory starting from the configuration result of the first gate, and minimizing with respect to the second gate, without consideration of the impact of the selecting that state vector partition candidate 210 would have on the operation of subsequently executed gates. The greedy optimization algorithm progresses in this manner through all the gates of each state partition of the proposed state vector partition candidate 210 to arrive at a set of state vector partitions 136 to pass to the quantum circuit simulator 146.

In some embodiments, the feedback optimizer 228 may implement, for example and without limitation, a branching optimization algorithm. Using the branching optimization, the state vector partition optimization engine 140 implements brute force optimization for selected paths (e.g., sequential processions) of quantum gates in each of the state partitions of the state vector partition candidate 210. Note that if only one path is selected, then the branching optimization technique essentially reduces back to the greedy algorithm, and if all paths are selected then the branching optimization technique reduces back to the brute force algorithm. When more than one but fewer than all paths are selected, the branching optimization algorithm may select which paths to evaluate based on a combination of optimization logic such as, but not limited to, 1) heuristic rules (e.g., avoiding rotating qubits), 2) lower intermediate cost (e.g., if 8 paths are reduced down to 4 paths before continuing on to the next gate, the 4 paths that so far require the least time are selected), and 3) hard cutoffs (eliminating configurations that violate limits of the quantum circuit simulator 146), to arrive at a set of state vector partitions 136 to pass to the quantum circuit simulator 146.

To simulate the quantum circuit, selected state vector partition candidates (e.g., that satisfy the cutoff cost threshold) may be passed to the quantum circuit simulator 146 as the set of state vector partitions 136 where individual state partitions of the set of state vector partitions 136 may be simulated by distributing execution of the individual state partitions to the most efficient processing devices for executing those partitions as identified by the state vector partition optimization engine 140. The quantum simulation results 152 produced by the quantum circuit simulator 146 for a quantum circuit simulation may be obtained based on combining (e.g., by adding together) the results of the simulations of individual state partitions of the set of state vector partitions 136. In some embodiments, to produce quantum simulation result 152, the quantum circuit simulator 146 may extract a representation of at least a component of a state of a state vector of the quantum computing circuit, extract a representation of at least one component of one or more product states of the quantum computing circuit, obtain an expectation value of the original quantum computing circuit, sample at least one component of one or more product states of the final state, and/or compute a norm of the final state vector. For example, in some embodiments, an expectation value derived from a quantum simulation result 152 may be used as an input to the classical simulator 142, and/or to inform a machine learning algorithm executing on the quantum circuit simulator 146.

Now referring to FIG. 6, FIG. 6 is a flow diagram showing a method 600 for simulating a quantum circuit, in accordance with some embodiments of the present disclosure. The features and elements described herein with respect to the method 600 of FIG. 6 may be used in conjunction with, in combination with, or substituted for elements of, any of the other embodiments discussed herein and vice versa. Further, the functions, structures, and other descriptions of elements for embodiments described in FIG. 6 may apply to like or similarly named or described elements across any of the figures and/or embodiments described herein and vice versa.

Each block of method 600, described herein, comprises a computing process that may be performed using any combination of hardware, firmware, and/or software. For instance, various functions may be carried out by a processor executing instructions stored in memory. The methods may additionally, or alternatively, be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to the example quantum simulation computing platform 120 of FIG. 1. However, these methods may additionally or alternatively be executed by any one system, or any combination of systems, including, but not limited to, those described herein.

Method 600 at B612 includes generating, based at least on a representation of a quantum computing circuit, at least one state vector partition candidate that includes a plurality of sparse state partitions. For example, in some embodiments, a state vector partition candidate generator, such as the state vector partition candidate generator 138, partitions a quantum computing circuit by selecting a sparse state vector template that includes a fractional subset of state elements of the state vector of the quantum computing circuit. In some embodiments, the sparse state vector template may include one or more zero value elements corresponding to a state element of the state vector not included in the sparse state vector template. The state vector partition candidate generator may determine when application of one or more quantum gates of the quantum computing circuit to the sparse state vector template produces a sparse updated quantum state and generate at least one state vector partition candidate based at least on the sparse state vector template, when application of the one or more quantum gates of the quantum computing circuit to the sparse state vector template produces the sparse updated quantum state. Simulating the quantum circuit using sparse state partitions avoids memory allocations and read/write operations for state elements not represented in a respective sparse state partition, thus eliminating memory and/or other overhead related latencies which may, for example, result in faster simulation execution times.

Method 600 at B614 includes computing an efficiency estimate associated with executing at least one state vector partition candidate based at least on a computing platform topology of a quantum simulation computing platform. The computing platform topology may comprise a profile of computing resources of the quantum simulation computing platform for executing a simulation of the quantum computing circuit. At least one state vector partition candidate may be iteratively refined based on at least one of the following: gate grouping, gate complexity, or qubit ordering, to produce at least one refined state vector partition candidate, and a compute cost may be estimated that indicates the efficiency associated with executing at least one state vector partition candidate based at least on at least one refined state vector partition candidate. In some embodiments, one or more of: a gate grouping score, a gate complexity score, and qubit ordering score, may be computed for the plurality of sparse state partitions. The efficiency estimate may be based on at least on one or more of: the gate grouping score, the gate complexity score, and the qubit ordering score. The set of state vector partitions executed for simulating the quantum circuit may be based at least on the efficiency estimate.

Method 600 at B616 includes selecting a set of state vector partitions from the at least one state vector partition candidate based at least on the efficiency estimate. In some embodiments, using the representation of the quantum computing circuit, a plurality of state vector partition candidates may be generated that include the plurality of sparse state partitions. A ranking of efficiencies may then be computed for the plurality of state vector partition candidates, and the set of state vector partitions selected based at least on efficiencies for individual state vector partition candidates of the plurality of state vector partition candidates.

Method 600 at B618 includes simulating the quantum computing circuit on the quantum simulation computing platform using the set of state vector partitions. Computing resources of the quantum simulation computing platform may be selected for executing individual sparse state partitions of the plurality of sparse state partitions based on the efficiency estimate. In some embodiment, the method may proceed to output a simulation result for the quantum computing circuit, wherein the simulation result is computed based at least on simulation results of simulating individual sparse state partitions of the plurality of sparse state partitions. For example, the method may include extracting from the simulation result a representation of at least a component of a state of a state vector of the quantum computing circuit; extracting a representation of at least one component of one or more product states of the quantum computing circuit; obtaining an expectation value of the quantum computing circuit; sampling at least one component of one or more product states of a final state; and/or computing a norm of a final state vector. In some embodiments, a simulation result for the quantum computing circuit may be computed based at least on simulation results of individual sparse state partitions of the plurality of sparse state partitions.

As discussed above, memory allocations and read/write operations by the quantum circuit simulator, when simulating the quantum circuit using the set of state vector partitions, may be avoided for the zeroed state elements not represented in that respective partition, eliminating memory and/or other overhead related latencies. Increased efficiency is thus obtainable in simulating small system quantum circuits using the embodiments described herein by avoiding latencies within the simulation platform hardware.

Figure 7:
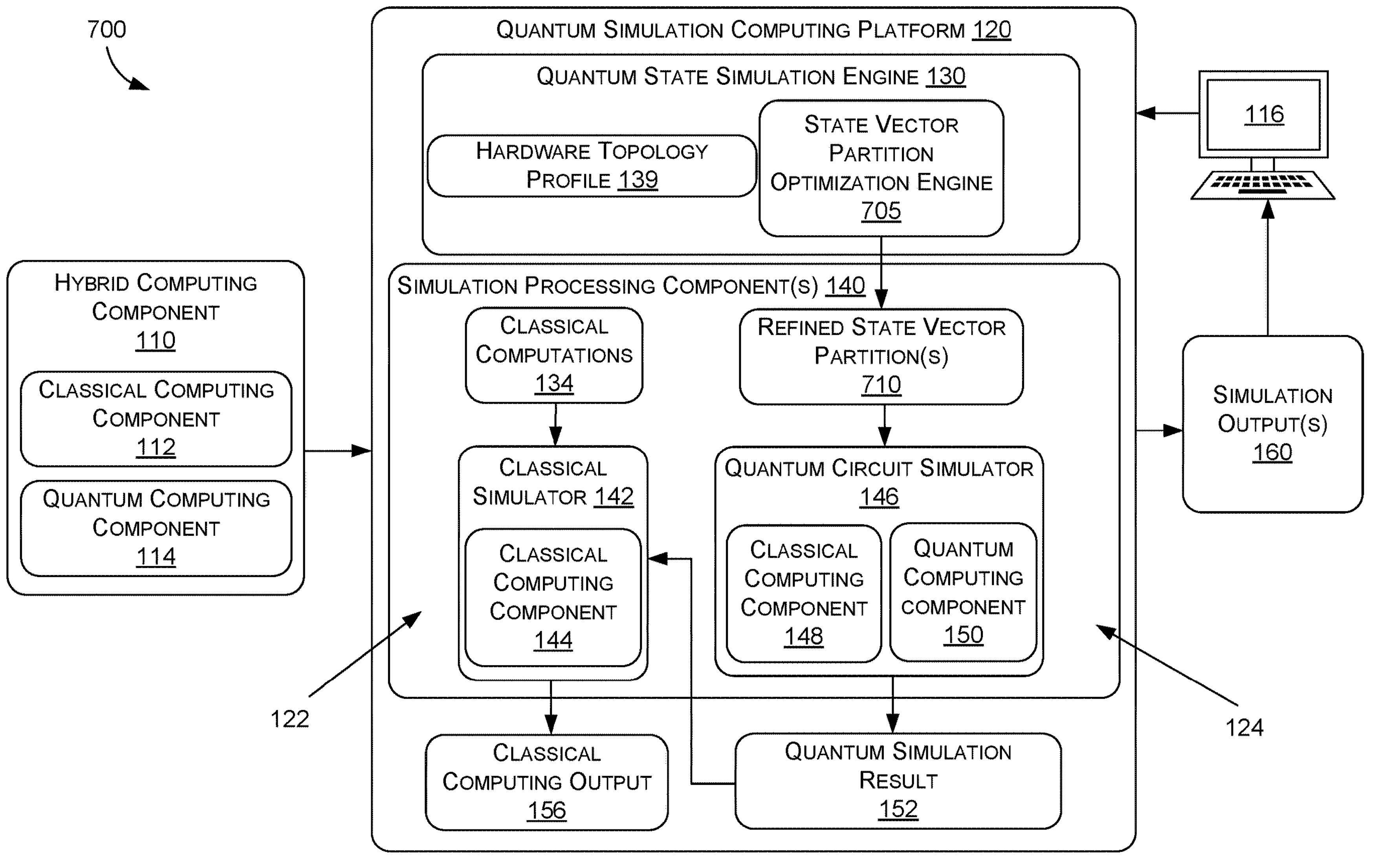
FIG. 7 is an illustration of an example flow diagram for a quantum simulation computing platform, in accordance with some embodiments of the present disclosure.

Although some of the embodiments disclosed herein describe the use of the state vector partition optimization engine 140 in conjunction with state vector partition candidates comprising sparse state partitions produced by a state vector partition candidate generator 138, other use cases and context are contemplated for other embodiments of a state vector partition optimization engine. For example, referring to FIG. 7, FIG. 7 illustrates a data flow diagram illustrating a simulation environment 700 that includes the example quantum simulation computing platform 120 discussed with respect to FIG. 1, in accordance with some embodiments of the present disclosure.

While the quantum simulation computing platform 120 does comprise the quantum state simulation engine 130 (e.g., software executed on platform 120 to initiate and control the execution of simulations based on the hybrid computing component 114), the quantum state simulation engine 130 in this embodiment may include a state vector partition optimization engine 705 that produces one or more refined (e.g., optimized) state vector partitions 710 for execution by the quantum circuit simulator 146 based on a process that may not include a state vector partition candidate generator 138 generating state vector partition candidates 210.

Figure 8:
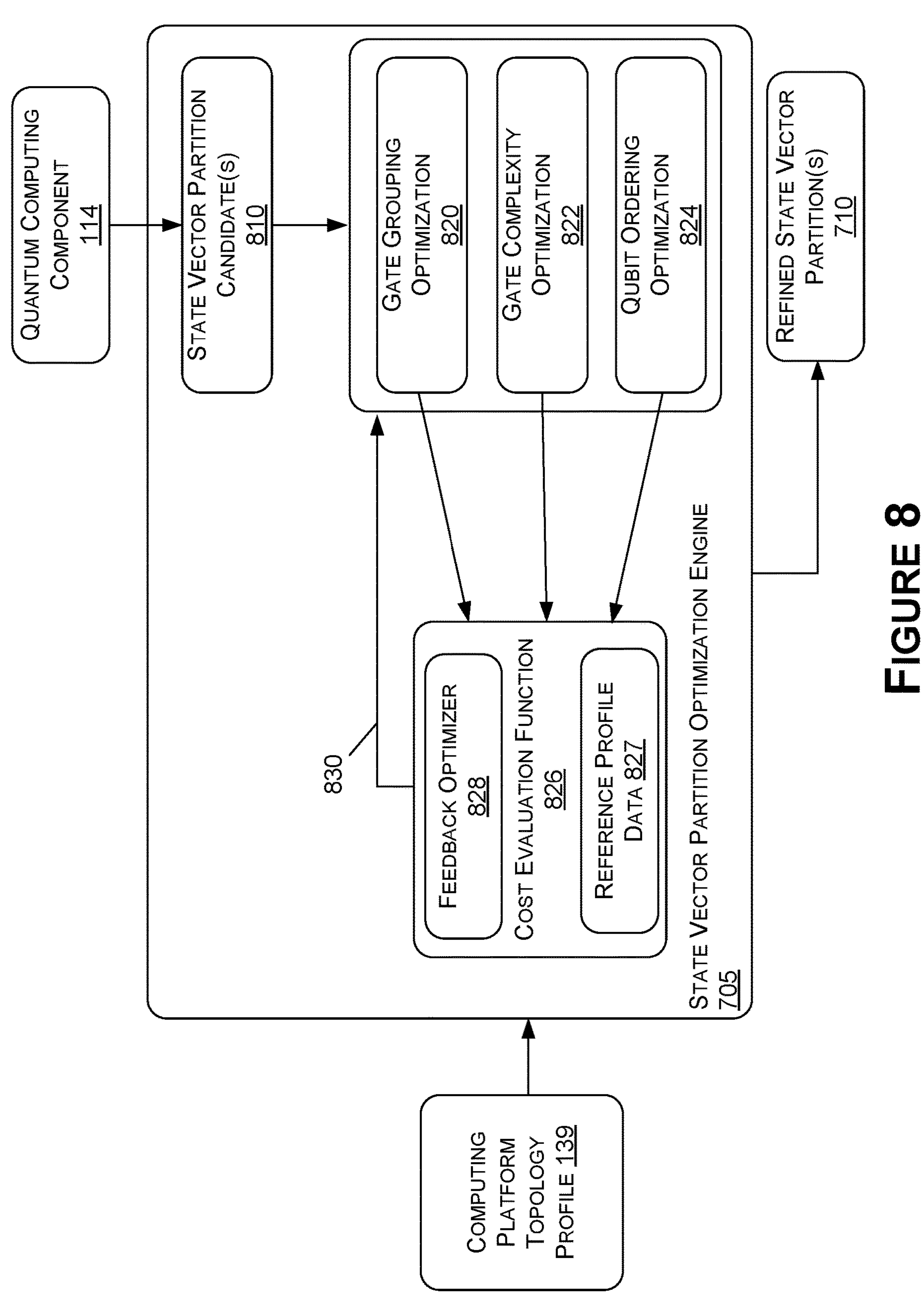
FIG. 8 is an illustration of an example flow diagram for optimizing simulation of quantum computing circuits, in accordance with some embodiments of the present disclosure.

For example, now referring to FIG. 8, FIG. 8 illustrates a state vector partition optimization engine 705 that may receive one or more state vector partition candidates 810 derived from the quantum circuit represented by the quantum computing component 114. The state vector partition candidate(s) 810 may comprise sparse state partitions, non-sparse state partitions, or a combination of sparse and non-sparse state partitions. Moreover, the state vector partition candidate(s) 810 may comprise a fractional subset of state elements of the state vector of the quantum circuit (that is, less than all of the elements of the full state vector of the quantum circuit), or a state partition that comprises the full set of state elements of the state vector of the quantum circuit.

The state vector partition optimization engine 705 may execute one or more of a gate grouping optimization 820, a gate complexity optimization 822, and/or a qubit ordering optimization 824 for the state vector partition candidate(s) 810. In the same way as discussed above for the gate grouping optimization 220, gate complexity optimization 222, and/or qubit ordering optimization 224 functions, the gate grouping optimization 820, gate complexity optimization 822, and/or qubit ordering optimization 824 functions evaluate the state vector partition candidate(s) 810 with respect to how they may be best optimized for simulation by the quantum circuit simulator 146 given the computing platform topology profile 139 for quantum circuit simulator 146. Refined versions of the state partitions may then be evaluated by a cost evaluation function 826 with respect to efficiency given the computing platform topology. As discussed above, the state vector partition optimization engine 705 may evaluate and/or refine the state vector partition candidate(s) 810 in batch as a set. The state vector partition optimization engine 705 may compute the costs for a set of different state vector partition candidates, ranking each candidate by a cost score and/or determining which, if any, satisfy a cutoff cost threshold. In some embodiments, the state vector partition optimization engine 705 may operate as a closed loop optimizer, providing feedback 830 to the gate grouping optimization 820, gate complexity optimization 822, and/or qubit ordering optimization 824 to adjust one or more partitions of state vector partition candidate(s) 810 in order to attempt to iteratively converge on an optimized state vector partition candidate(s) 810 that satisfy a cutoff cost threshold.

Each of the gate grouping optimization 820, gate complexity optimization 822, and/or qubit ordering optimization 824 functions may operate as described with respect to the corresponding elements shown in FIG. 2. As such the described functions of gate grouping optimization 220, gate complexity optimization 222, and qubit ordering optimization 224 functions apply respectively to the gate grouping optimization 820, gate complexity optimization 822, and qubit ordering optimization 824 functions. For example, regarding the qubit ordering optimization 824, a goal of this function of the state vector partition optimization engine 705 is to adjust the order of significance of the qubits in a state vector partition 810 to a more refined (e.g., optimized)

configuration with respect to reducing communication requirements. Regarding the gate complexity optimization 822, the goal of this function of the state vector partition optimization engine 705 is to evaluate the computational intensity of implementing quantum gates of the quantum circuit on a state vector partition 810 (e.g., floating-points operations per second (FLOPS) and/or memory operations). The gate complexity optimization 822 may evaluate when the complexity of a gate may be reduced by splitting a gate into smaller and less complex component gates, as discussed above. Regarding the gate grouping optimization 820, the goal of this function of the state vector partition optimization engine 705 is to adjust the grouping of gates in a partition to a more refined (e.g., optimized) configuration with respect to reducing computational operations (e.g., FLOPs and/or memory operations).

In some embodiments, the cost evaluation function 826 of the state vector partition optimization engine 705 may receive a qubit ordering score, a gate complexity score, and/or a gate grouping score for the state vector partition candidate(s) 810. Based on the score(s) and the computing platform topology profile 139, the cost evaluation function 826 may estimate an efficiency (referred to herein as a compute cost) for executing state vector partition candidate (s) 810 to simulate the quantum circuit of quantum computing component 114. Based on the qubit ordering score, the gate complexity score, and/or the gate grouping score, the cost evaluation function 826 may determine (e.g., through an optimization algorithm) which permutation of the processing devices available to the quantum circuit simulator 146 results in the most efficient simulation of the quantum circuit using the state vector partition candidate(s) 810.

The cost evaluation function 826 may estimate an efficiency (e.g., a quantitative compute cost) that may be used to rank state vector partition candidate(s) 810 against other state vector partition candidate(s) 810 and/or determine if a state vector partition candidate(s) 810 satisfies a cutoff cost threshold. In some embodiments, the efficiency estimate may include indications of simulation parameters such as, but not limited to, a time dissolution metric, a simulation time to complete score, a memory usage and/or a FLOP metric, for example. In some embodiments, the state vector partition optimization engine 705 may pass the refined state vector partition(s) 710 together with configuration information indicating assignments of state partitions that are to be scheduled on corresponding processing devices of the quantum circuit simulator 146.

In some embodiments, the cost evaluation function 826 may use reference profile data 827, derived at least in part using the computing platform topology profile 139 and/or quantum computing component 114, to generate a compute cost for state vector partition candidate(s) 810. The reference profile data 827 may comprise an inventory of standard quantum gate operations (e.g., based on determining an inventory of gate types present in the quantum circuit), wherein each standard quantum gate operation is cross-referenced to one or more pre-determined compute costs for executing that quantum gate operation on a processing device having a given configuration and/or specifications (e.g., processing speed, number of cores, bit depth). For example, the pre-determined compute costs may be determined based on empirical data that characterizes the execution of a gate on one or more processing device configurations defined by the computing platform topology profile 139. The cost evaluation function 826 may estimate a compute cost for state vector partition candidate(s) 810 by determining from the reference profile data 827 a cost for simulating a state partition, and/or based on the sum of costs of executing the gates within that state partition on one or more possible permutations of processing devices available to the quantum circuit simulator 146.

In some embodiments, state vector partition candidate(s) 810 can be iteratively evaluated and refined by the state vector partition optimization engine 705 using an optimization loop. In such an embodiment, the state vector partition candidate(s) 810 is processed by the qubit order optimization 824, gate complexity optimization 822, and/or the gate grouping optimization 820 as discussed above, and the resulting qubit order score, gate complexity score, and/or gate grouping score processed by the cost evaluation function 826 to determine the compute score for that state vector partition candidate(s) 810 in view of the computing platform topology profile 139. If the resulting compute score does not satisfy the cutoff cost threshold, the cost evaluation function 826 may generate feedback (shown at 830) that triggers the generation of an updated iteration of the state vector partition candidate(s) 810. For example, when the cost evaluation function 826 determines that state vector partition candidate (s) 810 do not satisfy a cutoff cost threshold, state vector partition candidate(s) 810 may be adjusted (e.g., with respect to partition structure, gate grouping, gate complexity, and/or qubit ordering) and the updated state vector partition candidate(s) 810 re-evaluated, with the processes repeating until a state vector partition candidate(s) 810 is found that does satisfy the cutoff cost threshold, or until it is determined that a state vector partition candidate(s) 810 that satisfies the cutoff cost threshold is not readily attainable (e.g., given the current computing platform topology for quantum circuit simulator 146).

In some embodiments, feedback 830 may simply indicate that the state vector partition candidate(s) 810 is inadequate. Based on that feedback 830, the gate grouping optimization 220, gate complexity optimization 222, and/or qubit ordering optimization 224 may respectively refine (e.g., optimize) state vector partition candidate(s) 810 based on different gate groupings, gate complexities and/or qubit ordering. The cost evaluation function 826 may then compute a compute cost for the updated state vector partition candidate(s) 810 and similarly evaluate that compute cost against the cutoff cost threshold. The optimization loop may iteratively repeat in this manner until state vector partition candidate(s) 810 that satisfy the cutoff cost threshold is identified.

In some embodiments, the state vector partition optimization engine 705 may further comprise a feedback optimizer 828 that generates the feedback 830 based on an optimization algorithm (such as any of the brute force optimization, greedy optimization, and/or branching optimization algorithms discussed above, or another optimization algorithm). For example, the feedback optimizer 828 may input the compute cost estimated by the cost estimation function for the state vector partition candidate(s) 810, and execute an optimization algorithm that generates feedback 830 to control the state vector partition optimization engine 705 (e.g., gate grouping optimization 820, gate complexity optimization 822, and/or qubit ordering optimization 824) to produce an adjusted state vector partition candidate(s) 810 that results in an refined (e.g., optimized) qubit order score, gate complexity score, and/or gate grouping score, and that is expected to satisfy, or at least better converge on, the cutoff cost threshold.

For example, the feedback optimizer 828, based on the estimated compute costs, may generate a feedback 830 indicating that the proposed state vector partition candidate 210 calls for using too much memory and/or takes too long to execute and the state vector partition optimization engine 140 may respond by generating a refined (e.g., optimized) proposed state vector partition candidate(s) 810 that uses less memory and/or executed faster, by adjusting parameters such as qubit ordering, gate complexity, and/or gate grouping. The optimization loop may iteratively repeat in this manner until a state vector partition candidate(s) 810 that satisfies the cutoff cost threshold is identified and output as the refined state vector partition(s) 710. In some embodiments, after one or more repeated iterations (e.g., after the number of iterations reaches a predefined threshold), the state vector partition optimization engine 705 may select a sub-optimal state vector partition candidate(s) 810 as the refined state vector partition(s) 710 for simulation that may not completely satisfy the cutoff cost threshold, but is at least within a predetermined tolerance of the cutoff cost threshold.

Now referring to FIG. 9, FIG. 9 is a flow diagram showing a method 900 for simulating a quantum circuit, in accordance with some embodiments of the present disclosure. The features and elements described herein with respect to the method 900 of FIG. 9 may be used in conjunction with, in combination with, or substituted for elements of, any of the other embodiments discussed herein and vice versa. Further, the functions, structures, and other descriptions of elements for embodiments described in FIG. 9 may apply to like or similarly named or described elements across any of the figures and/or embodiments described herein and vice versa.

Each block of method 900, described herein, comprises a computing process that may be performed using any combination of hardware, firmware, and/or software. For instance, various functions may be carried out by a processor executing instructions stored in memory. The methods may be embodied as computer-usable instructions stored on computer storage media. The methods may be provided by a standalone application, a service or hosted service (standalone or in combination with another hosted service), or a plug-in to another product, to name a few. In addition, method 900 is described, by way of example, with respect to the example quantum simulation computing platform 120 of FIGS. 7 and 8. However, these methods may additionally or alternatively be executed by any one system, or any combination of systems, including, but not limited to, those described herein.

Method 900 at B912 includes receiving a representation of a quantum computing circuit. In some embodiments, the representation may include one or more state vector partitions derived from a quantum circuit represented by a quantum computing component as illustrated in FIG. 7. The one or more state vector partitions may comprise sparse state partitions, non-sparse state partitions, or a combination of sparse and non-sparse state partitions. Moreover, the one or more state vector partitions may comprise a fractional subset of state elements of the state vector of the quantum circuit (that is, less than all of the elements of the full state vector of the quantum circuit), or a state partition that comprises the full set of state elements of the state vector of the quantum circuit.

The method 900 at B914 includes iteratively refine at least one state vector partition derived from the quantum computing circuit with respect to at least one of a gate grouping, a gate complexity, or a qubit ordering. The at least one state vector partition may be iteratively refined with respect to the qubit ordering based at least on an estimate of time to perform memory operations for different qubit orderings of the at least one state vector partition. An efficiency estimate associated with executing the at least one state vector partition may be computed based at least on a computing platform topology of the quantum simulation computing platform. The at least one state vector partition may be adjusted with respect to at least one of a gate grouping, a gate complexity, and/or a qubit ordering, based on the efficiency estimate.

In some embodiments, feedback for adjusting at least one of the gate grouping of the at least one state vector partition, the gate complexity of the at least one state vector partition, and/or the qubit order of the at least one state vector partition may be generated based on the efficiency estimate.

In some embodiments, the at least one state vector partition may be iteratively refined (e.g., based on the feedback) with respect to the gate complexity based at least on determining an indication of matrix diagonalization associated with a product space matrix. In some embodiments, the at least one state vector partition nay be iteratively refined (e.g., based on the feedback) with respect to the gate grouping based at least on an estimate of computational operations to apply a composite gate derived from accumulating a plurality of gates of the quantum computing circuit. In some embodiments, the at least one state vector partition may be iteratively refined (e.g., based on the feedback) with respect to the qubit ordering based at least on an estimate of time to perform memory operations for different qubit orderings of the at least one state vector partition. In some embodiment, the at least one state vector partition may be iteratively refined with respect to at least one of: the gate grouping, the gate complexity, or the qubit ordering. Refinement may be performed, according to one or more embodiments, based on applying an optimization algorithm to the at least one state vector partition such as: a brute force optimization algorithm, a greedy optimization algorithm, a branching optimization algorithm, for example and without limitation.

The efficiency associated with executing the at least one state vector partition may be estimated based at least on a computing platform topology of the quantum simulation computing platform. For example, an inventory of gate types present in the at least one state vector partition may be determined, and reference profile data then determined based at least on estimated compute costs for executing individual gates of the inventory of gate types on one or more processing devices of the quantum computing simulation platform. An efficiency associated with executing the at least one state vector partition may be estimated based at least on the reference profile data. In some embodiments, computing resources of the quantum simulation computing platform may be selected for executing individual state partitions based on the efficiency.

The method 900 at B916 includes simulating at least a portion of the quantum computing circuit on a quantum simulation computing platform based at least on the at least one state vector partition. In some embodiment, an output comprising a simulation result for the quantum computing circuit may be computed based at least on results of simulating the at least one state vector partition. A state vector partition optimization engine may evaluate partitioning candidates to determine which partitioning candidate(s) can be most efficiently executed by the quantum circuit simulator. For example, a state vector partition optimization engine may consider the hardware and runtime frameworks available for simulating each partition candidate and/or may iteratively compute computational cost metrics based on the available combinations of software and hardware. In some embodiment, the method may proceed to output a simulation result for the quantum computing circuit, wherein the simulation result is computed based at least on simulation results of simulating individual refined state vector partitions. For example, the method may include extracting, from the simulation result, a representation of at least a component of a state of a state vector of the quantum computing circuit; extracting a representation of at least one component of one or more product states of the quantum computing circuit; obtaining an expectation value of the quantum computing circuit; sampling at least one component of one or more product states of a final state; and/or computing a norm of a final state vector. In some embodiments, a simulation result for the quantum computing circuit may be computed based at least on simulation results of individual sparse state partitions of the plurality of sparse state partitions.

Example Computing Device

Figure 10:
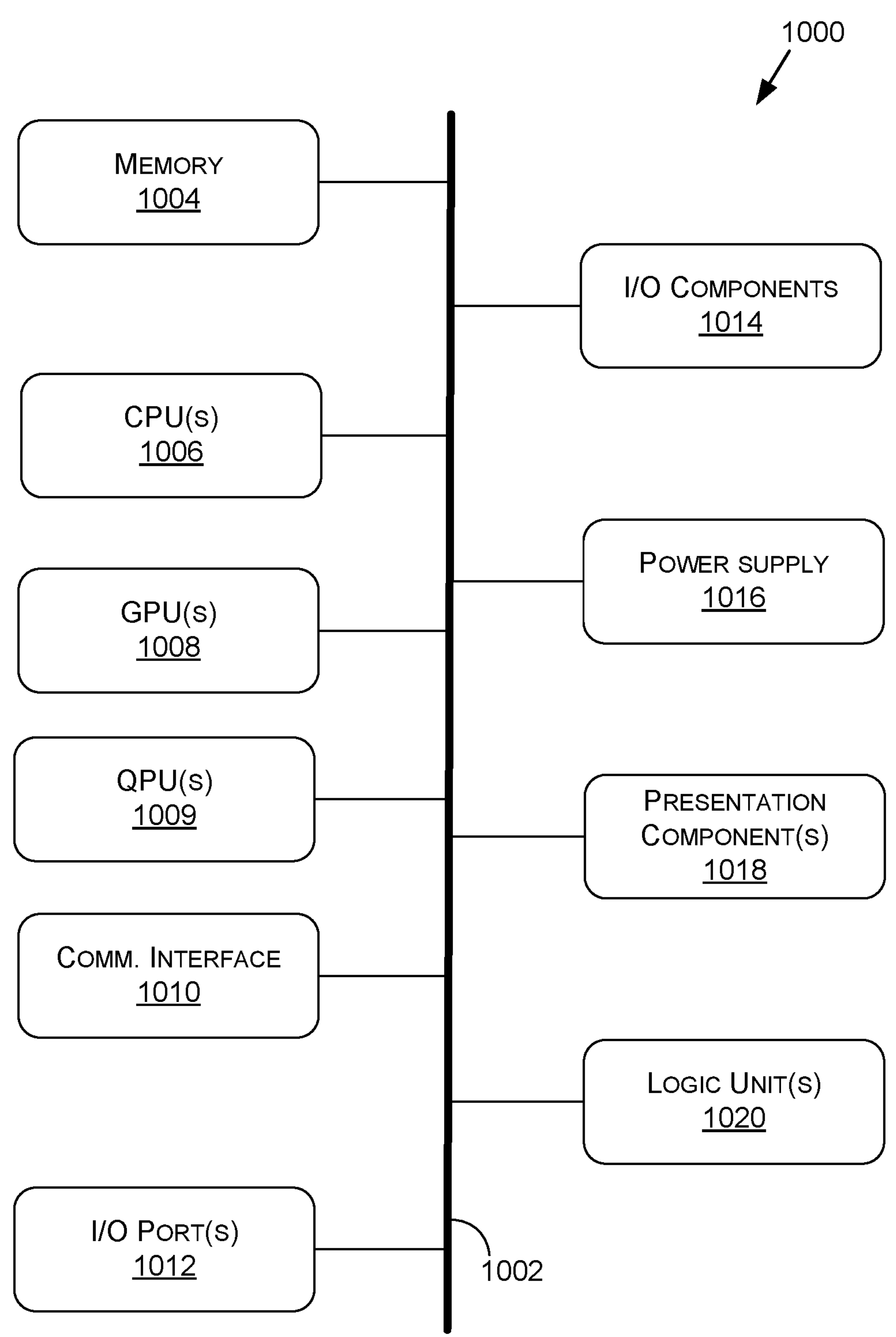
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. For example, one or more elements of the quantum simulation computing platform 120, such as the quantum state simulation engine 130 and/or the simulation processing component(s) 140 may be implemented using one or more of computing device(s) 1000. Computing device 1000 may include an interconnect system 1002 that directly or indirectly couples the following devices: memory 1004, one or more central processing units (CPUs) 1006, one or more graphics processing units (GPUs) 1008, one or more quantum processing units (QPUs) 1009, a communication interface 1010, input/output (I/O) ports 1012, input/output components 1014, a power supply 1016, one or more presentation components 1018 (e.g., display(s)), and/or one or more logic units 1020. In some embodiments, quantum simulation computing platform 120 and/or simulation processing component(s) 140 are implemented at least in part using one or more of the CPU(s) 1006, GPU(s) 1008 and/or QPU(s) 1009. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to, or alternatively from, the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally or alternatively, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.). In some embodiments, the HMI of user device 116 may be implemented at least in part using the presentation component(s) 1018

Example Data Center

Figure 11:
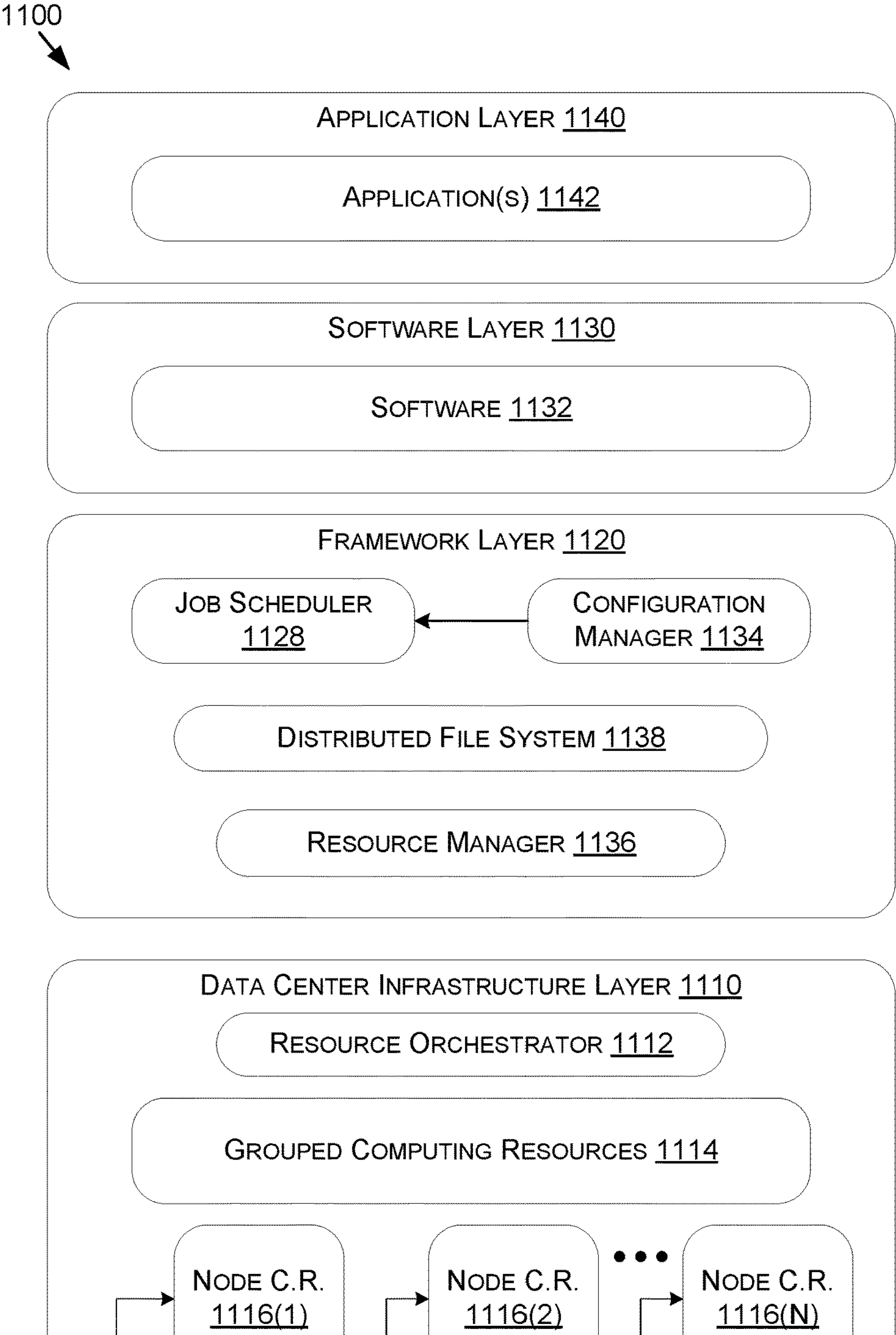
FIG. 11 is a block diagram of an example data center suitable for use in implementing some embodiments of the present disclosure.

FIG. 11 illustrates an example data center 1100 that may be used in at least one embodiments of the present disclosure. For example, one or more elements of the quantum simulation computing platform 120, such as the quantum state simulation engine 130 and/or the simulation processing component(s) 140 may be implemented using data center 1100. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may include any number of power modules, cooling modules, and/or network switches, in any combination. In some embodiments, quantum simulation computing platform 120 and/or simulation processing component(s) 141 are implemented at least in part using one or more of the node C.R.s 1116(1)-1116(N).

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1128, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application (s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1128 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1128. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment- and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might additionally or alternatively be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A processor comprising:

one or more circuits to:

generate, based at least on a representation of a quantum computing circuit, at least one candidate set of state vector partitions that includes a plurality of state partitions;

compute an efficiency associated with executing the at least one candidate set of state vector partitions based at least on a topology profile defining computing resources of a topology of a quantum simulation computing platform;

select a subset of state vector partitions from the at least one candidate set of state vector partitions based at least on the efficiency; and simulate the quantum computing circuit on the quantum simulation computing platform using the selected subset of state vector partitions.

2. The processor of claim 1, the one or more circuits further to:

output a simulation result for the quantum computing circuit, wherein the simulation result is computed based at least on simulation results of simulating individual state partitions of the plurality of state partitions.

3. The processor of claim 2, wherein the one or more circuits are further to perform at least one operation from the group of operations comprising:

extracting, from the simulation result, a representation of at least a component of a state vector of the quantum computing circuit;

extracting a representation of at least one component of one or more product states of the quantum computing circuit;

obtaining an expectation value of the quantum computing circuit;

sampling at least one component of one or more product states of a final state; or computing a norm of a final state vector.

4. The processor of claim 1, wherein the one or more circuits are further to:

select a sparse state vector template that includes: a fractional subset of state elements of a state vector of the quantum computing circuit and one or more zero elements;

determine when application of one or more quantum gates of the quantum computing circuit to the sparse state vector template produces a sparse updated quantum state; and generate, using the sparse state vector template and based at least on a determination that application of the one or more quantum gates of the quantum computing circuit to the sparse state vector template produces a sparse updated quantum state, the at least one candidate set of state vector partitions.

5. The processor of claim 1, wherein the topology of the quantum simulation computing platform comprises a profile of computing resources of the quantum simulation computing platform for executing a simulation of the quantum computing circuit.

6. The processor of claim 1, wherein the one or more circuits are further to:

iteratively refine the at least one candidate set of state vector partitions based at least on one of gate grouping, gate complexity, or qubit ordering, to produce at least one refined state vector partition candidate; and estimate a compute cost indicating the efficiency associated with executing the at least one candidate set of state vector partitions based at least on the at least one refined state vector partition candidate.

7. The processor of claim 1, wherein the one or more circuits are further to:

compute, for the plurality of state partitions, one or more of a gate grouping score, a gate complexity score, or a qubit ordering score;

compute the efficiency further based at least on one or more of the gate grouping score, the gate complexity score, or the qubit ordering score; and select the subset of state vector partitions based at least on the efficiency.

8. The processor of claim 1, wherein the one or more circuits are further to:

select computing resources of the quantum simulation computing platform for executing individual state partitions of the plurality of state partitions based on the efficiency.

9. The processor of claim 1, wherein the one or more circuits are further to:

generate, based at least on the representation of the quantum computing circuit, a plurality of state vector partition candidates that include the plurality of state partitions; and rank efficiencies computed for the plurality of state vector partition candidates.

10. The processor of claim 1, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for generating or presenting at least one of virtual reality content, augmented reality content, or mixed reality content;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center;

a system for performing generative AI operations;

a system implemented at least partially using a language model;

a system implemented at least partially using cloud computing resources;

a system implemented at least partially using quantum computing resources;

a system utilizing a Quantum Processing Unit (QPU);

a system for performing a state preparation;

a system for compiling a quantum circuit;

a system for executing a quantum circuit;

a system for measuring a quantum state; or a system for measuring a state of a qubit or qubits.

11. A system comprising:

one or more processing units to execute operations comprising:

generating at least one candidate set of state vector partitions that includes a plurality of state partitions based at least on a representation of a quantum computing circuit;

selecting a subset of state vector partitions from the at least one candidate set of state vector partitions based at least on an efficiency of simulating the subset of state vector partitions on a quantum simulation computing platform, the efficiency determined based at least on a topology profile defining computing resources of the quantum simulation computing platform; and simulating the quantum computing circuit on the quantum simulation computing platform using the selected subset of state vector partitions.

12. The system of claim 11, the operations further comprising:

outputting a simulation result for the quantum computing circuit, wherein the simulation result is computed based at least on simulation results of individual state partitions of the plurality of state partitions.

13. The system of claim 12, the operations further comprising at least one of:

extracting from the simulation result a representation of at least a component of a state vector of the quantum computing circuit;

extracting a representation of at least one component of one or more product states of the quantum computing circuit;

obtaining an expectation value of the quantum computing circuit;

sampling at least one component of one or more product states of a final state; or computing a norm of a final state vector.

14. The system of claim 11, the operations further comprising:

iteratively refining the at least one candidate set of state vector partitions based on at least one of gate grouping, gate complexity, or qubit ordering, to produce at least one refined state vector partition candidate; and estimating a compute cost indicating the efficiency associated with executing the subset of state vector partitions using the at least one refined state vector partition candidate.

15. The system of claim 11, the operations further comprising:

computing the efficiency of simulating the subset of state vector partitions based at least on a computing platform topology that comprises a profile of computing resources of the quantum simulation computing platform for executing a simulation of the quantum computing circuit.

16. The system of claim 11, the operations further comprising:

selecting a sparse state vector template that includes: a fractional subset of state elements of a state vector of the quantum computing circuit and one or more zero elements;

determining when application of one or more quantum gates of the quantum computing circuit to the sparse state vector template produces a sparse updated quantum state; and generating, based on the application of the one or more quantum gates of the quantum computing circuit to the sparse state vector template producing the sparse updated quantum state, the at least one candidate set of state vector partitions.

17. The system of claim 11, the operations further comprising:

computing one or more of a gate grouping score, a gate complexity score, and qubit ordering score, for the plurality of state partitions;

computing the efficiency further based at least on one or more of the gate grouping score, the gate complexity score, and the qubit ordering score; and selecting the subset of state vector partitions based at least on the efficiency.

18. The system of claim 11, the operations further comprising:

generating, based at least on the representation of the quantum computing circuit, a plurality of state vector partition candidates that include the plurality of state partitions; and selecting the subset of state vector partitions based at least on the plurality of state partitions, based on efficiencies for individual state vector partition candidates of the plurality of state vector partition candidates.

19. The system of claim 11, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for generating or presenting at least one of virtual reality content, augmented reality content, or mixed reality content;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center;

a system implemented at least partially using cloud computing resources;

a system implemented at least partially using quantum computing resources;

a system utilizing a Quantum Processing Unit (QPU);

a system for performing a state preparation;

a system for compiling a quantum circuit;

a system for executing a quantum circuit;

a system for measuring a quantum state; or a system for measuring a state of a qubit or qubits.

20. A method comprising:

simulating a quantum computing circuit on a quantum simulation computing platform based at least on computing simulation results of individual state partitions of a plurality of state partitions determined from the quantum computing circuit, the individual state partitions selected based at least in part on an estimate of efficiency associated with executing the plurality of state partitions on the quantum simulation computing platform, the estimate of efficiency determined based at least on a topology profile defining computing resources of the quantum simulation computing platform.

* * * * *